United States Patent
Friedrich et al.

(10) Patent No.: US 11,747,604 B2
(45) Date of Patent: Sep. 5, 2023

(54) METHOD AND DEVICE FOR SCANNING A SAMPLE

(71) Applicant: LEICA MICROSYSTEMS CMS GMBH, Wetzlar (DE)

(72) Inventors: Lars Friedrich, Mannheim (DE); Holger Birk, Meckesheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 449 days.

(21) Appl. No.: 16/760,486

(22) PCT Filed: Nov. 5, 2018

(86) PCT No.: PCT/EP2018/080208
§ 371 (c)(1),
(2) Date: Apr. 30, 2020

(87) PCT Pub. No.: WO2019/086680
PCT Pub. Date: May 9, 2019

(65) Prior Publication Data
US 2020/0355898 A1   Nov. 12, 2020

(30) Foreign Application Priority Data
Nov. 3, 2017   (DE) ..................... 10 2017 125 688.1

(51) Int. Cl.
*G02B 21/00* (2006.01)
*G02B 21/06* (2006.01)

(52) U.S. Cl.
CPC ..... *G02B 21/0036* (2013.01); *G02B 21/0032* (2013.01)

(58) Field of Classification Search
CPC .. G02B 21/00; G02B 21/002; G02B 21/0024; G02B 21/0032; G02B 21/0036; G02B 21/0048; G02B 21/06
(Continued)

(56) References Cited

U.S. PATENT DOCUMENTS 6,028,306 A * 2/2000 Hayashi ............. G02B 21/0032
                                                            359/368
6,677,596 B2   1/2004 Engelhardt et al.
(Continued)

FOREIGN PATENT DOCUMENTS

DE   102012019121 A1   4/2013
DE   102014119027 A1   6/2016
(Continued)

OTHER PUBLICATIONS

Bewersdorf, Jörg et al. "Multifocal multiphoton microscopy," Optics Letters, May 1, 1998, 23, 655-657.
(Continued)

*Primary Examiner* — Thong Q Nguyen
(74) *Attorney, Agent, or Firm* — Leydig, Voit & Mayer, Ltd.

(57) ABSTRACT

A method for scanning a sample includes generating at least two illumination points in order to form a point pattern, wherein the point pattern has a settable number of illumination points. At least one freely selectable parameter for defining the point pattern is preset or is set. At least one predefined region of the sample is scanned by moving the point pattern defined by the freely selectable parameter along a first direction such that scan lines assigned to the illumination points of the point pattern are generated, and along a second direction such that further scan lines are generated in each case following the scan lines. The movement of the point pattern in the second direction is carried out in scan steps of identical size or at a constant speed. The illumination points of the point pattern are arranged on a line along the second direction.

20 Claims, 26 Drawing Sheets

(58) Field of Classification Search
USPC .................................................. 359/368–390
See application file for complete search history.

(56) References Cited

U.S. PATENT DOCUMENTS

| | | | |
|---|---|---|---|
| 7,339,148 B2 * | 3/2008 | Kawano | G02B 21/0048 250/201.3 |
| 7,724,426 B2 | 5/2010 | Yamashita et al. | |
| 8,054,542 B2 | 11/2011 | Sasaki et al. | |
| 2007/0041090 A1 | 2/2007 | Graefe et al. | |
| 2007/0127003 A1 | 6/2007 | Aikawa | |
| 2010/0277580 A1 | 11/2010 | Stallinga et al. | |
| 2014/0232848 A1 | 8/2014 | Schwedt et al. | |
| 2015/0226677 A1 | 8/2015 | Sullivan et al. | |

FOREIGN PATENT DOCUMENTS

| | | | |
|---|---|---|---|
| EP | 1431795 A1 | | 6/2004 |
| JP | 2017-173592 A | | 9/2017 |
| WO | WO 2005/033767 A1 | | 4/2005 |
| WO | WO 2009/066252 A2 | | 5/2009 |
| WO | WO 2009/111407 A2 | | 9/2009 |
| WO | WO 2020/064481 A1 * | | 4/2020 |

OTHER PUBLICATIONS

Bergermann, Fabian et al., "2000-fold parallelized dual-color STED fluorescence nanoscopy," Optics Express; Jan. 5, 2015, 23, 211-223.

Fittinghoff, David N. et al., "Widefield multiphoton and temporally decorrelated multifocal multiphoton microscopy," Optics Express, Oct. 9, 2000, 7, 273-279.

Sacconi, L. et al., "Multiphoton multifocal microscopy exploiting a diffractive optical element," Optics Letters, Oct. 15, 2003, 28, 1918-1920.

Hecht, David L., "Multibeam Acoustooptic and Electrooptic Modulators," Proc. SPIE 0396, Advances in Laser Scanning and Recording, 2, Oct. 26, 1983.

Powell, Karlton et al.. (Eds.), "Multi-beam Bidirectional Raster Scanning in Retinal Scanning Displays," Helmet- and Head-Mounted Displays VI, Aug. 22, 2001, 4361.

Bingen, Pit et al., "Parallelized STED fluorescence nanoscopy," Optics Express, Nov. 7, 2011, 19, 23716-23726.

Martini, Jörg, "Multifocal Multiphoton Microscopy: New Detection Methods and Biological Applications," Bielefeld University, Nov. 2006, Dissertation.

* cited by examiner

Mode D2

3 illumination points

Mode D3

2 illumination points

Mode D4

3 illumination points

Mode C2

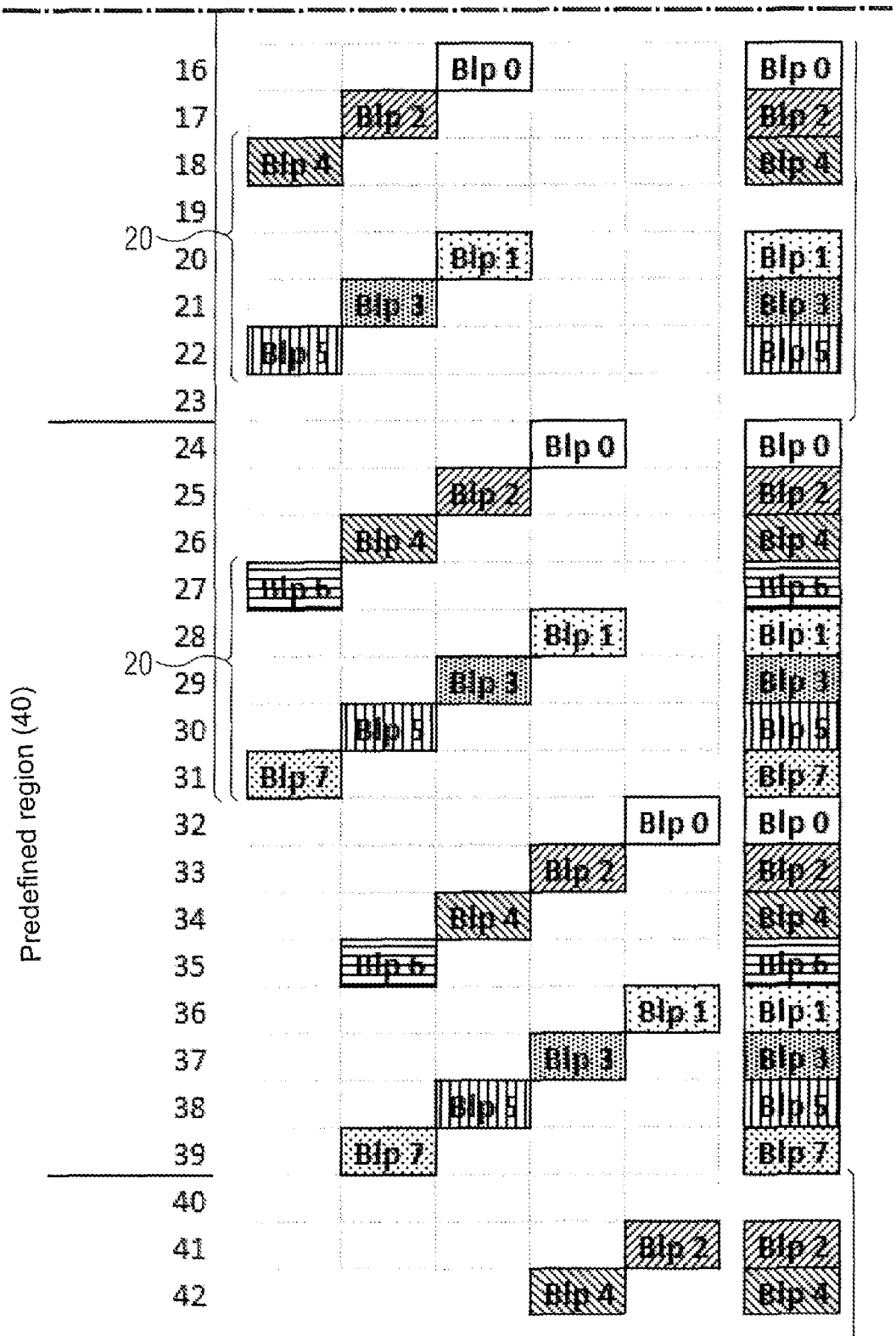

4 illumination points 4 illumination points 3 illumination points

Mode B

METHOD AND DEVICE FOR SCANNING A SAMPLE

CROSS-REFERENCE TO PRIOR APPLICATIONS

This application is a U.S. National Phase Application under 35 U.S.C. § 371 of International Application No. PCT/EP2018/080208, filed on Nov. 5, 2018, and claims benefit to German Patent Application No. DE 10 2017 125 688.1, filed on Nov. 3, 2017. The International Application was published in German on May 9, 2019 as WO 2019/086680 under PCT Article 21(2).

FIELD

The invention relates to a method for scanning a sample, which involves generating at least two illumination points in order to form a point pattern. The point pattern has a settable number of illumination points. The invention furthermore relates to a device for scanning a sample.

BACKGROUND

In the case of scanning microscopes, it is a known problem that the scan speed cannot be increased arbitrarily. Reasons for this are, firstly, the limited speed of the devices that bring about a scan movement, such as, for example, galvanometer mirrors, acousto-optical deflectors (AOD) or electro-optical deflectors. Secondly, the signal-to-noise ratio decreases more and more at higher scan speeds since the residence duration of the illumination point on the respective point on the sample becomes shorter and shorter.

U.S. Pat. No. 6,677,596 B2 and Bewersdorf, J.; Pick, R. and Hell, S. W., "Multifocal multiphoton microscopy," Opt Lett, 1998, 23, 655-657 disclose methods for scanning a sample in which the illumination light beam used for scanning is split into a plurality of illumination light points in order to parallelize the scan process. U.S. Pat. No. 7,724,426 B2 discloses a method for scanning a sample in which the illumination light beam used for scanning is split into a plurality of illumination points by an AOD in order to parallelize the scan process.

Bergermann, F.; Alber, L.; Sahl, S. J.; Engelhardt, J. and Hell, S. W., "2000-fold parallelized dual-color STED fluorescence nanoscopy," Opt Express; 2014, 23, 211-223, U.S. Pat. No. 8,054,542 B2, Fittinghoff, D. N.; Wiseman, P. W. and Squier, J., "Widefield multiphoton and temporally decorrelated multifocal multiphoton microscopy," Opt Express, 2000 and Sacconi, L.; Froner, E.; Antolini, R.; Taghizadeh, M. R.; Choudhury, A. and Pavone, F. S., "Multiphoton multifocal microscopy exploiting a diffractive optical element," Opt Lett, 2003 disclose methods for scanning a predefined region of a sample in which a point pattern is generated with the aid of an illumination light beam split into a plurality of illumination points. The point pattern extends over a large part of the predefined region of the sample along one direction. The illumination points are arranged equidistantly along this direction. In a plurality of scan steps, successive scan lines are scanned in the direction of the aforementioned direction until the predefined region has been completely scanned. One disadvantage of these methods is that the size of the point pattern is directly coupled to the size of the predefined region. Another disadvantage of these methods is that there are technical limits for the size of the point pattern and/or of the predefined region because the optical components for generating the point pattern have to be embodied in a disadvantageously large fashion. Furthermore, in the event of the illumination light beam being split by an AOD, large distances between the illumination points result in a particularly high degree of spatial dispersion, which can have a disadvantageous effect, particularly with the use of broadband illumination light sources, for example short-pulse lasers.

Hecht, D. L. Beiser, L. (Ed.), "Multibeam Acoustooptic and Electrooptic Modulators," Proc. SPIE 0396, Advances in Laser Scanning and Recording, 2, 1983 and Powell, K.; Urey, H. and Bayer, M. Lewandowski, R. J.; Haworth, L. A.; Girolamo, H. J. & Rash, C. E. (Eds.), "Multi-beam Bidirectional Raster Scanning in Retinal Scanning Displays," Helmet- and Head-Mounted Displays VI, 2001, 4361 disclose methods for scanning a predefined region of a sample in which a point pattern is generated with the aid of an illumination light beam split into a plurality of illumination points. The point pattern consists of a plurality of illumination points which are arranged successively at a distance of one scan line. With the aid of the point pattern, the predefined region is scanned completely in a plurality of scan steps. One disadvantage of these methods is that in certain microscopy methods, in particular in multi-photon microscopy, a small distance between the illumination points results in a low axial resolution since the illumination points can widen outside the focal plane and overlap there. In other words, the low axial resolution results from the fact that the illumination points localized in three dimensions can widen outside the focal plane and overlap there, such that the localization is reduced along the direction of propagation (axial direction).

Bingen, P.; Reuss, M.; Engelhardt, J. and Hell, S. W., "Parallelized STED fluorescence nanoscopy," Opt Express, 2011, 19, 23716-23726 discloses a method for scanning a predefined region of a sample in which a point pattern is generated with the aid of an illumination light beam split into a plurality of illumination points. The illumination points of the point pattern are arranged equidistantly along one direction. Along this direction successive scan lines of a portion of the predefined region are scanned in a plurality of scan steps. This is repeated for further portions of the predefined region arranged along the aforementioned direction, such that the predefined region results from the respectively scanned portions. One disadvantage of this method is that step sizes of different magnitudes have to be realized during scanning, which can result in undesired image artefacts particularly with the use of mechanical scanning devices, which have only a limited precision.

DE 10 2012 019 121 A1 discloses a further method for scanning a predefined region of a sample in which a point pattern is generated with the aid of a plurality of illumination points. By means of the illumination points of the point pattern, along one direction successive scan lines of a portion of the predefined region are scanned in a plurality of scan steps. Once the portion has been scanned, the point pattern is moved by a plurality of scan lines along the aforementioned direction in order to scan a further portion of the predefined region. The predefined region results from the respectively scanned portions. In this method, too, step sizes of different magnitudes have to be realized during scanning, which can result in undesired image artefacts.

Martini, J., "Multifocal Multiphoton Microscopy: New Detection Methods and Biological Applications," Bielefeld University, 2006, Dissertation discloses a further method for scanning a predefined region of a sample in which a point pattern is generated with the aid of an illumination light beam split into a plurality of illumination points.

SUMMARY

In an embodiment, the present invention provides a method for scanning a sample. The method includes generating at least two illumination points in order to form a point pattern, wherein the point pattern has a settable number of illumination points. At least one freely selectable parameter for defining the point pattern is preset or is set. At least one predefined region of the sample is scanned by moving the point pattern defined by the freely selectable parameter along a first direction such that scan lines assigned to the illumination points of the point pattern are generated, and along a second direction such that further scan lines are generated in each case following the scan lines. The movement of the point pattern in the second direction is carried out in scan steps of identical size or at a constant speed. The illumination points of the point pattern are arranged on a line along the second direction.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
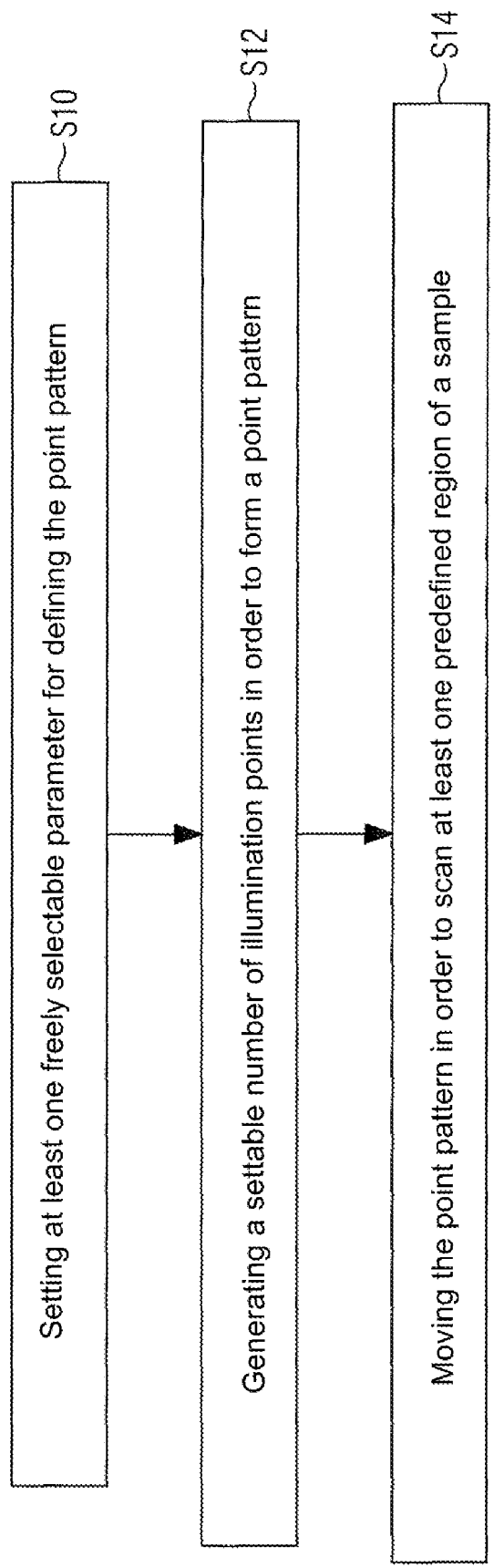
FIG. 1 shows one exemplary embodiment of a method for scanning a sample.

In an embodiment, the present invention provides a method for scanning a sample which enables flexible generation of an optimum point pattern for scanning the sample.

The method according to an embodiment of the invention for scanning a sample involves generating at least two illumination points in order to form a point pattern. The point pattern has a settable number of illumination points. At least one freely selectable parameter for defining the point pattern is preset or is set. The point pattern defined by the freely selectable parameter, in order to scan at least one predefined region of the sample, is moved along a first direction in order to generate scan lines assigned to the illumination points of the point pattern and along a second direction in order to generate scan lines generated in each case following the scan lines, wherein the movement of the point pattern in the direction of the second direction is carried out in scan steps of identical size or at a constant speed. The illumination points of the point pattern are arranged on a line along the second direction.

The point pattern formed with the aid of the method according to an embodiment of the invention is defined firstly by the settable number of illumination points. The point pattern is defined secondly by the at least one freely selectable parameter. This enables flexible generation of an optimum point pattern for scanning a sample. The at least one freely selectable parameter can be set in a variable manner, preferably by an operator, when the method is carried out. As an alternative thereto, the at least one freely selectable parameter can also be preset.

According to an embodiment of the invention, the point pattern is moved in the second direction in scan steps of identical size or at a constant speed. However, this is not intended in principle to exclude the fact that the point pattern can also be moved counter to the second direction. Such a movement of the point pattern counter to the second direction is provided for example in the following three cases. First, abrupt scan steps counter to the second direction can be effected in a plurality of scan passes. Second, as specified in the exemplary embodiment according to FIG. 11, embodiments are conceivable in which the scan process provides scan steps counter to the second direction. Third, an embodiment of the invention also encompasses scan processes in which the image region is scanned again counter to the second direction, for example in order to fill gaps.

In one advantageous embodiment, when the point pattern is moved along the first direction, the predefined region is scanned continuously or step by step. As a result of the continuous or step by step scanning, scan lines are scanned along the first direction, which scan lines can serve as a basis for the generation of image lines in a later detection method.

In a further advantageous embodiment, when the point pattern is moved along the second direction, the predefined region is scanned step by step or continuously. During this step by step or continuous scanning, the point pattern is moved by at least one scan line along the second direction in a scan step. During the step by step scanning along the second direction, the point pattern jumps by one or more scan lines along the second direction, for example after it has reached the end of a scan line during movement along the first direction or at least one of the scan lines has been completely scanned along the first direction. During the continuous scanning along the second direction, the point pattern moves for example at a constant speed along the second direction. In particular, in this case, after a period in the first direction (i.e. after the point pattern has reached the end of a scan line during movement along the first direction), the point pattern covers a distance corresponding to the scan step in the second direction. Preferably, the physical distance along the second direction assigned to a scan line or a scan step can be set. As a result, it is possible to set the resolution of the method along the second direction in a simple manner.

In a further advantageous embodiment, the illumination points of the point pattern are arranged equidistantly or form at least two groups of illumination points, wherein the illumination points of each of the groups are arranged equidistantly. The equidistant arrangement of the illumination points constitutes a particularly simple form of the point pattern, while the arrangement of the illumination points in a plurality of groups makes it possible to form relatively complex point patterns which are optimized to the effect that they enable a compromise between point patterns having a relatively small distance between adjacent illumination points and point patterns having a relatively large distance between adjacent illumination points.

In a further advantageous embodiment, a distance—defined in scan lines—between the illumination points of the point pattern and/or a number of groups of illumination points of the point pattern are/is set as the at least one freely selectable parameter. The length of the point pattern is correspondingly defined by the set distance between the illumination points. For a given maximum permissible total length of the point pattern and a given number of illumination points, a flexible method is achieved by means of this setting possibility. Furthermore, an optimum point pattern with regard to the compromise between point patterns having a relatively small distance between adjacent illumination points and point patterns having a relatively large distance between adjacent illumination points is achieved by means of the setting of the number of groups.

In a further advantageous embodiment, a distance—defined in scan lines—between the illumination points of the point pattern is set as the at least one freely selectable parameter. In this case, the point pattern, in order to scan the predefined region, is moved in at least two scan passes along the first and second directions. By virtue of the scanning of the predefined region in a plurality of scan passes, the size of the point pattern can be set to be larger than would be possible in the case of scanning in only one pass.

In a further advantageous embodiment, a part of the predefined region is scanned in each of the scan passes. The parts of the predefined region that are scanned in successive scan passes are offset relative to one another in each case by at least one scan line along the second direction. The predefined region can thus be scanned as in the case of a line interlacing method. In each of the scan passes, the predefined region is scanned substantially completely, with the result that a compromise is found between the use of many scan passes, which results in a high resolution of the scanning method, and a use of few scan passes, which results in a short duration of the scanning method. Advantageously, the respectively scanned parts of the predefined region can be processed further individually after a detection.

In a further advantageous embodiment, in each of the scan passes, the predefined region is scanned step by step along the second direction by the point pattern being moved, in a scan step, by a number of scan lines along the second direction which is equal to the product of the number of illumination points of the point pattern and the distance—defined in scan lines—between the illumination points of the point pattern. Preferably, the parts of the predefined region that are scanned in successive scan passes are offset relative to one another in each case by a scan line along the second direction. As a result, the predefined region is completely scanned. The number of scan passes that is necessary for complete scanning is equal to the distance—defined in scan lines—between the illumination points of the point pattern.

In a further advantageous embodiment, a number of groups of illumination points of the point pattern is set as the at least one freely selectable parameter. In this case, the set number of groups of illumination points of the point pattern is a divisor of the number of illumination points of the point pattern. Furthermore, the illumination points of each of the groups have the same number. This constitutes a simple possibility for dividing the illumination points of the point pattern into groups.

In a further advantageous embodiment, a distance—defined in scan lines—between the illumination points of the point pattern which are assigned to a single one of the groups of illumination points of the point pattern is equal to the set number of groups of illumination points of the point pattern. The illumination points assigned to a group are preferably arranged equidistantly. This affords a simple possibility of arranging the illumination points within a group.

In a further advantageous embodiment, a distance between the illumination points of the point pattern which are assigned to successive groups of illumination points of the point pattern is equal to the sum of the set number of groups of illumination points of the point pattern and one. The distance between two adjacent illumination points which are assigned to different groups is thus greater than the distance between two adjacent illumination points which are assigned to the same group. This is a simple possibility of arranging the different groups.

In a further advantageous embodiment, in a single scan pass, the predefined region is scanned step by step along the second direction by the point pattern being moved, in a scan step, by a number of scan lines along the second direction that is equal to the number of illumination points of the point pattern. As a result, firstly, a compromise between the use of relatively small point patterns and the use of relatively large point patterns is realized. Secondly, the scanning along the second direction is effected in scan steps of identical size, which is able to be realized in a simple manner particularly in the case of mechanical scanning devices.

Preferably, the illumination points of the point pattern are generated from an illumination light beam with the aid of an acousto-optical deflector (AOD) or with the aid of a beam splitter. The use of an AOD enables a simple and flexible setting of the distances between the illumination points and thus the entire width of the point pattern. Even complex point patterns can be generated with the aid of beam splitters.

In a further advantageous embodiment, when the point pattern is moved along the second direction, the predefined region is scanned step by step. During subsequent scan steps, the point pattern is moved in the second direction and oppositely to the second direction. What can be achieved as a result is that the scanned region of the sample in successive scan steps, becomes refined further and further as it were by the point pattern jumping back and forth along the second direction.

The invention furthermore relates to a device for scanning a sample. The device comprises an illumination unit, which generates at least two illumination points in order to form a point pattern, wherein the point pattern has a settable number of illumination points. The device furthermore comprises a control unit for controlling the illumination unit, wherein the control unit controls the illumination unit in such a way that at least one freely selectable parameter for defining the point pattern is set. The illumination unit moves the point pattern defined by the freely selectable parameter, in order to scan at least one predefined region of the sample, along a first direction in order to generate scan lines assigned to the illumination points of the point pattern and along a second direction in order to generate scan lines generated in each case following the scan lines. The device (scanning device) according to the invention for scanning a sample makes it possible to scan the sample with the aid of an adaptable point pattern. As a result, the device is flexibly adaptable, for example to different detection units.

Preferably, the illumination unit comprises at least one acousto-optical deflector (AOD) or at least one beam splitter.

The invention furthermore relates to a microscope comprising a device for scanning a sample of the type mentioned above.

Preferably, the at least one freely selectable parameter is set by an operator during the operation of the microscope. Furthermore, the at least one freely selectable parameter can also be preset before the microscope is started up.

Instead of the setting of the at least one freely selectable parameter by an operator, said at least one freely selectable parameter can also be set on the basis of an algorithm that determines the at least one freely selectable parameter from further parameters (such as e.g. image refresh rate, excitation wavelength of the illumination light beam or penetration depth) that are selectively settable by an operator for example.

The number of illumination points of the point pattern can be preset or be set during operation.

FIG. 1 shows one exemplary embodiment of a method for scanning a sample 100. In a step S10, at least one freely selectable parameter for defining a point pattern 10 is set by an operator. In a step S12, a settable number of illumination points, which hereinafter are generally provided with the reference sign 12, are generated. In a step S14, the point pattern, which hereinafter is generally provided with the reference sign 10, is moved in order to scan at least one predefined region 40 of the sample 100. In this case, the point pattern 10 is moved along a first direction in order to generate scan lines assigned to the illumination points 12 of the point pattern 10, said scan lines hereinafter generally being provided with the reference sign 14, and along a second direction in order to generate scan lines 14 generated in each case following the scan lines 14.

FIGS. 2 to 11 show exemplary embodiments of a method for scanning the sample 100 in which when the point pattern 10 is moved in step S14 at least the predefined region ("region of interest"; ROI) 40 is scanned continuously along the first direction and is scanned step by step along the second direction. The predefined region 40 is scanned step by step along the second direction in scan steps, which are generally provided with the reference sign 16.

FIGS. 2 to 11 show the positions of the illumination points ("Blp") 12, which are numbered consecutively beginning with 0, along the second direction, i.e. from top to bottom in FIGS. 2 to 11, in temporally successive scan steps 16, which are numbered consecutively beginning with 0. By means of the exemplary embodiments, in each case a scan region 41 is crossed, which is illustrated on the far right in FIGS. 2 to 11. This indicates in each case which scan line 14 was scanned by which illumination point 12.

FIGS. 2 to 5 show exemplary embodiments of a method for scanning the sample 100 in which a distance between two adjacent illumination points 12 of the point pattern 10 in scan lines is set as a freely selectable parameter. The modes of the exemplary embodiments shown in FIGS. 2 to 5 are designated by Dm, wherein m is the freely selectable parameter, i.e. the distance between two adjacent illumination points 12 of the point pattern 10 in scan lines. The illumination points 12 of the point pattern 10 are arranged equidistantly on a line along the second direction.

The point pattern 10, in order to scan the predefined region 40 of the sample 100, is moved along the first direction and along the second direction in a plurality of scan passes, which here are generally provided with the reference sign 18 and numbered consecutively beginning with 0. A part of the predefined region 40 is scanned in each of the scan passes 18. The parts of the predefined region 40 that are scanned in successive scan passes 18 are offset relative to one another in each case by a scan line 14 along the second direction. Overall, a number of scan passes 18 which is equal to the distance between two adjacent illumination points 12 of the point pattern 10 in scan lines are carried out. Advantageously, in each of the scan passes 18, results obtained by detection, for example, can be utilized individually.

The parts of the predefined region 40 are scanned step by step along the second direction by the point pattern 10 being moved, in each scan step, by a number of scan lines 14 along the second direction which is equal to the product of the number of illumination points 12 of the point pattern 10 and the distance—defined in scan lines 14—between the illumination points 12 of the point pattern 10.

Figure 2:
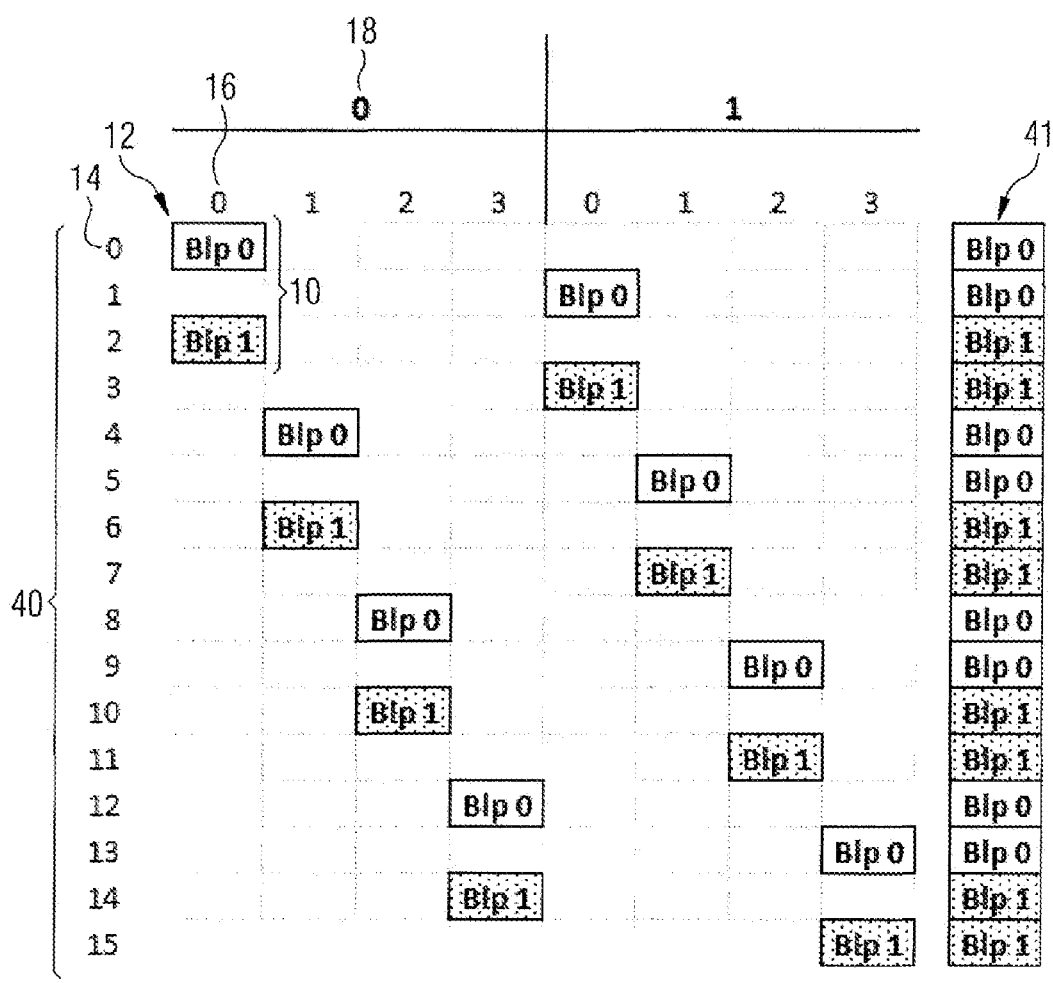
FIG. 2 shows one exemplary embodiment of a method for scanning the sample with two illumination points, in which a distance between two adjacent illumination points was set to two scan lines.

FIG. 2 shows one exemplary embodiment of the method for scanning the sample 100 with two illumination points 12, in which the distance between two adjacent illumination points 12 was set to two scan lines 14. The predefined region 40 is scanned completely in two scan passes 18, wherein the positions of the illumination points in the case of the second scan pass 18 (numbered 1) are offset by one scan line 14 relative to the first scan pass 18 (numbered 0).

Figure 3:
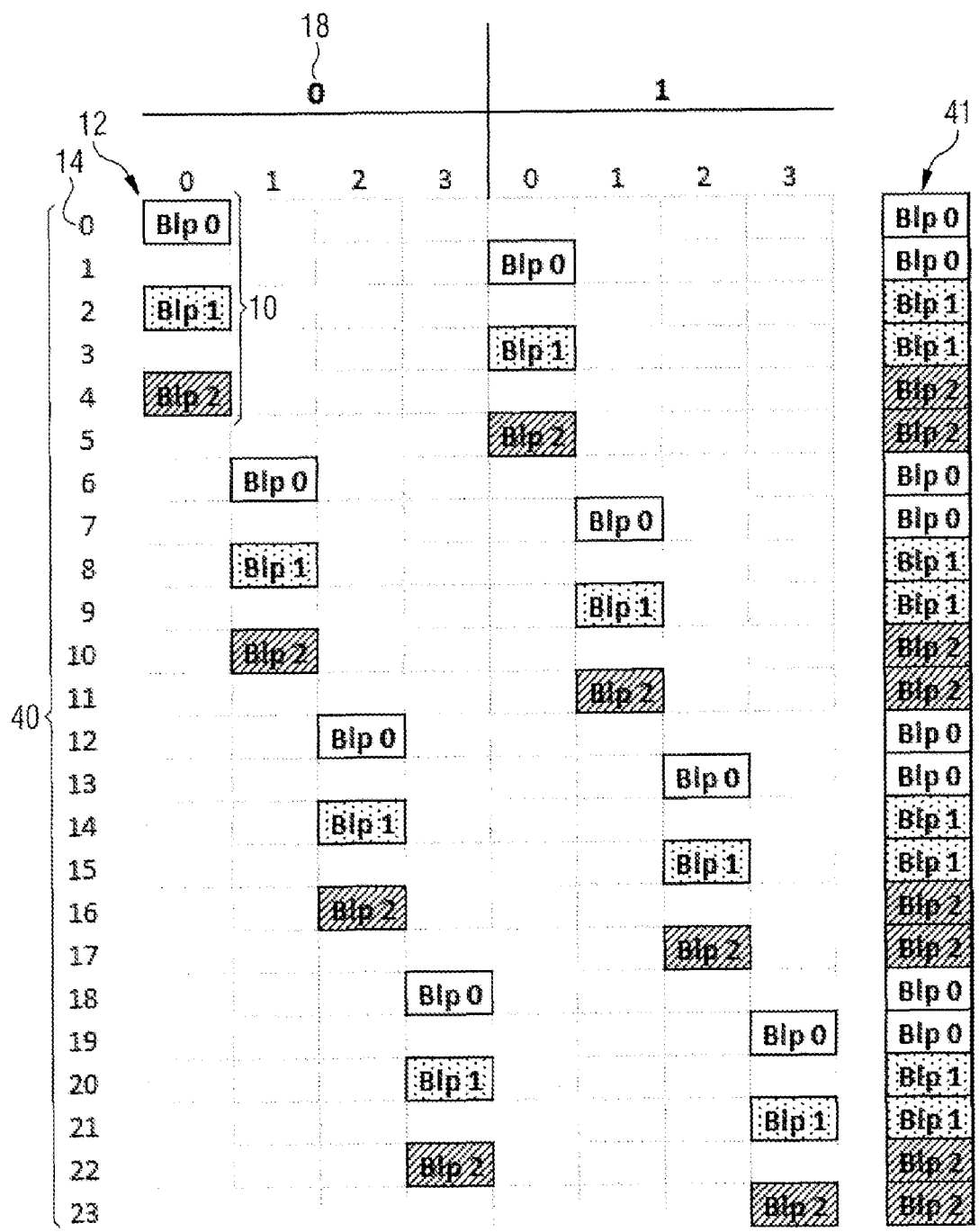
FIG. 3 shows one exemplary embodiment of a method for scanning the sample with three illumination points, in which the distance between two adjacent illumination points was set to two scan lines.

FIG. 3 shows one exemplary embodiment of the method for scanning the sample 100 with three illumination points 12, in which a distance between two adjacent illumination points 12 was set to two scan lines 14. Here, too, the predefined region 40 is scanned completely in two scan passes 18. The positions of the illumination points in the case of the second scan pass 18 (numbered 1) are offset by one scan line 14 relative to the first scan pass 18 (numbered 0).

Figure 4:
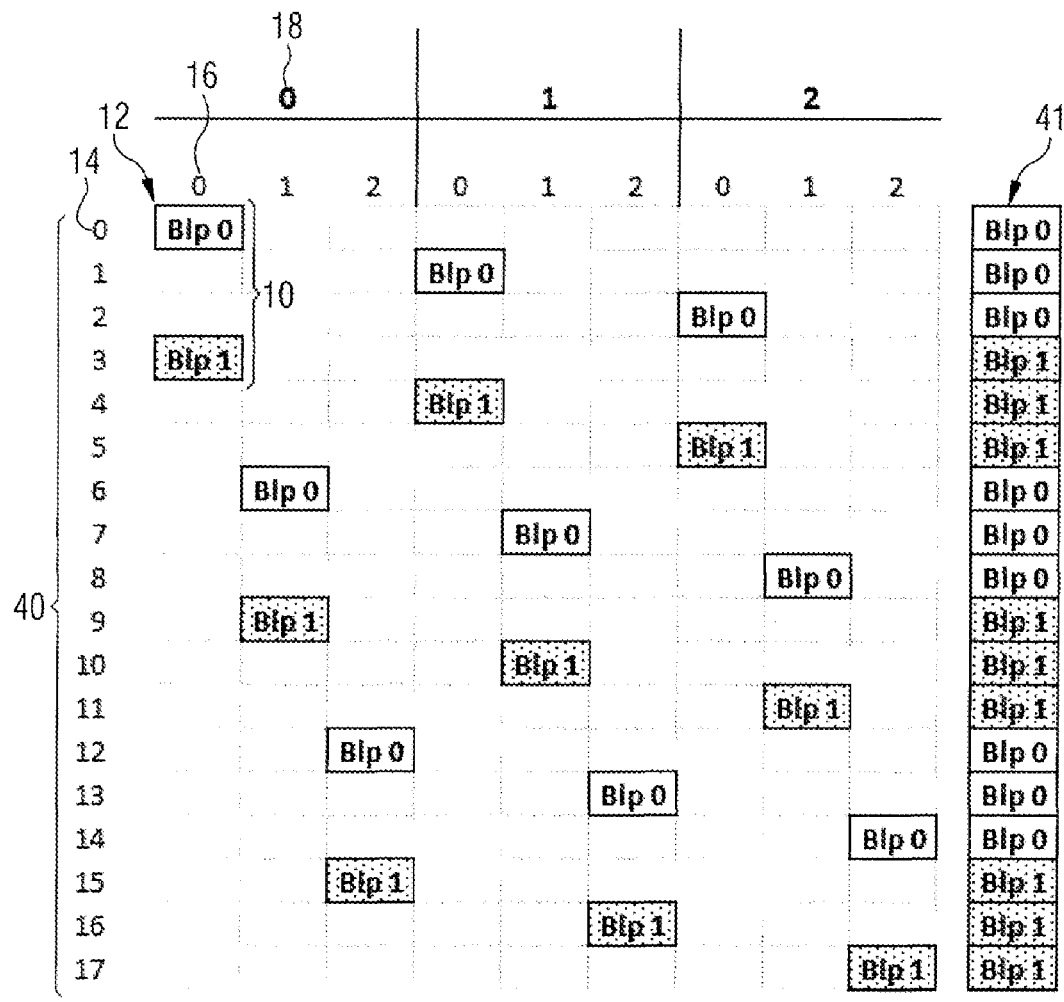
FIG. 4 shows one exemplary embodiment of a method for scanning the sample with two illumination points, in which the distance between two adjacent illumination points was set to three scan lines.

FIG. 4 shows one exemplary embodiment of the method for scanning the sample 100 with two illumination points 12, in which a distance between two adjacent illumination points 12 was set to three scan lines 14. Completely scanning the predefined region 40 here requires three scan passes 18. The positions of the illumination points are offset by one scan line 14 in the case of successive scan passes 18.

Figure 5:
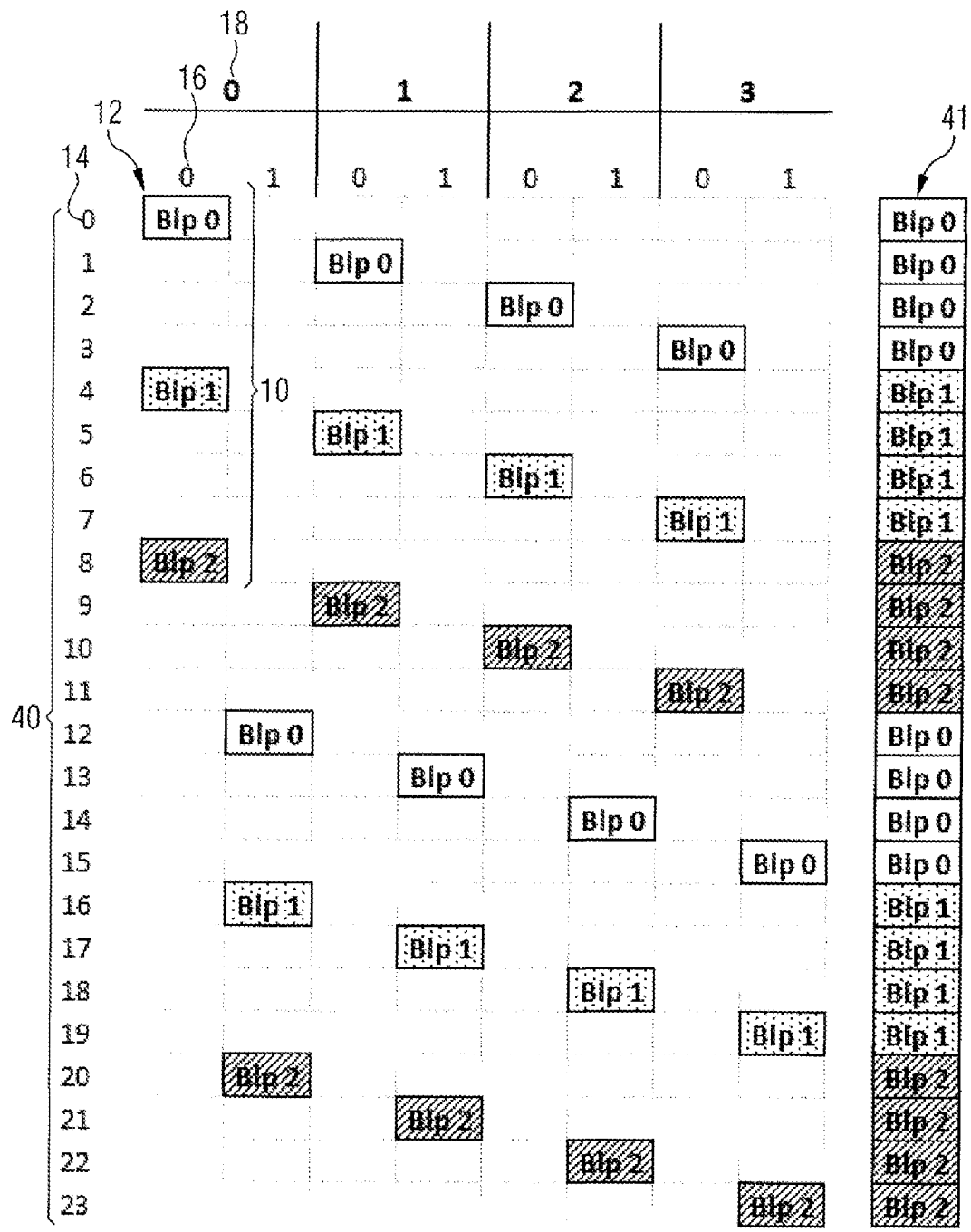
FIG. 5 shows one exemplary embodiment of a method for scanning the sample with three illumination points, in which the distance between two adjacent illumination points was set to four scan lines.

FIG. 5 shows one exemplary embodiment of the method for scanning the sample 100 with three illumination points 12, in which a distance between two adjacent illumination points 12 was set to four scan lines 14. Here the predefined region 40 is scanned completely in four scan passes 18, and the positions of the illumination points are offset by one scan line 14 in the case of successive scan passes 18.

FIGS. 6 to 10 show exemplary embodiments of the method for scanning the sample 100 in which a number of groups, which are generally provided with the reference sign 20, of illumination points 12 of the point pattern 10 is set as a freely selectable parameter. The modes of the exemplary embodiments shown in FIGS. 6 to 10 are designated by Cm, wherein m is the freely selectable parameter, i.e. here the number of groups 20 of illumination points 12 of the point pattern 10.

The set number of groups 20 of illumination points 12 of the point pattern 10 is a divisor of the number of illumination points 12 of the point pattern 10. The number of illumination points 12 respectively assigned to a group 20 is identical. The illumination points 12 of each of the groups 20 are arranged equidistantly on a line along the second direction. The distance in scan lines 14 between adjacent illumination points 12 of the point pattern 10 which are assigned to a single group 20 of illumination points 12 of the point pattern 10 is equal to the set number of groups 20 of illumination points 12 of the point pattern 10. The distance in scan lines 14 between adjacent illumination points 12 of the point pattern 10 which are assigned to successive groups 20 of illumination points 12 of the point pattern 10 is equal to the sum of the set number of groups 20 of illumination points 12 of the point pattern 10 and one.

The step by step scanning along the second direction is effected by the point pattern 10 being moved, in each scan step 16, by a number of scan lines 14 along the second direction which is equal to the number of illumination points 12 of the point pattern 10. In this case, along the second direction a region 41 is scanned which is larger than the predefined region 40 since gaps remain at the edge 42 of the scanned or illuminated region.

Figure 6:
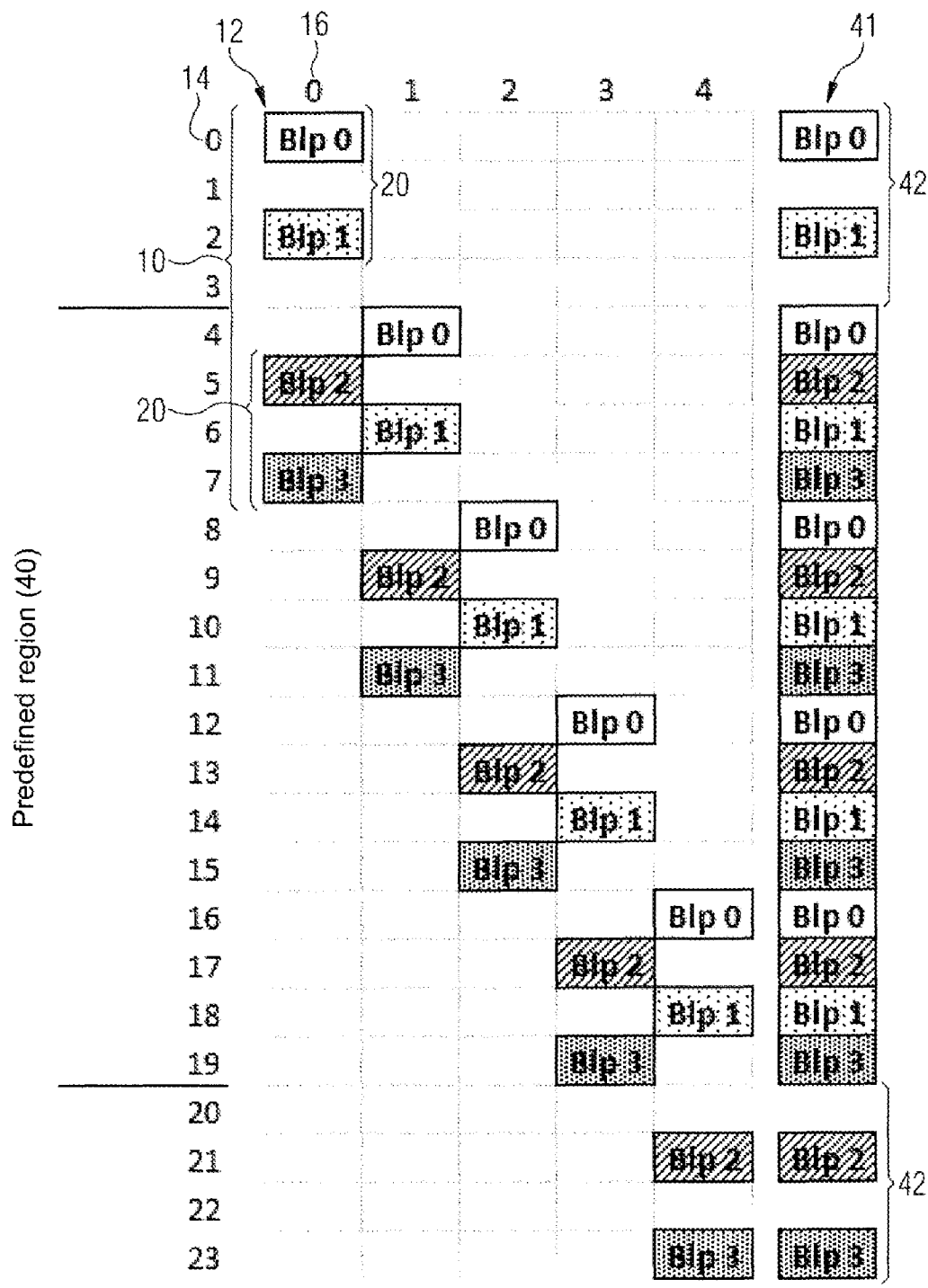
FIG. 6 shows one exemplary embodiment of a method for scanning the sample with four illumination points, in which a number of groups of illumination points was set to two.

FIG. 6 shows one exemplary embodiment of the method for scanning the sample 100 with four illumination points 12, in which the number of groups 20 of illumination points 12 was set to two. Within the groups 20, the distance between two adjacent illumination points 12 is two scan lines. Between the groups, the distance is three scan lines 14. The step size is four scan lines 14 in each scan step 16. As shown in FIG. 6, a region 41 somewhat larger than the predefined region 40 is illuminated since gaps remain at the edge 42 of the illuminated region 41.

Figure 7A:
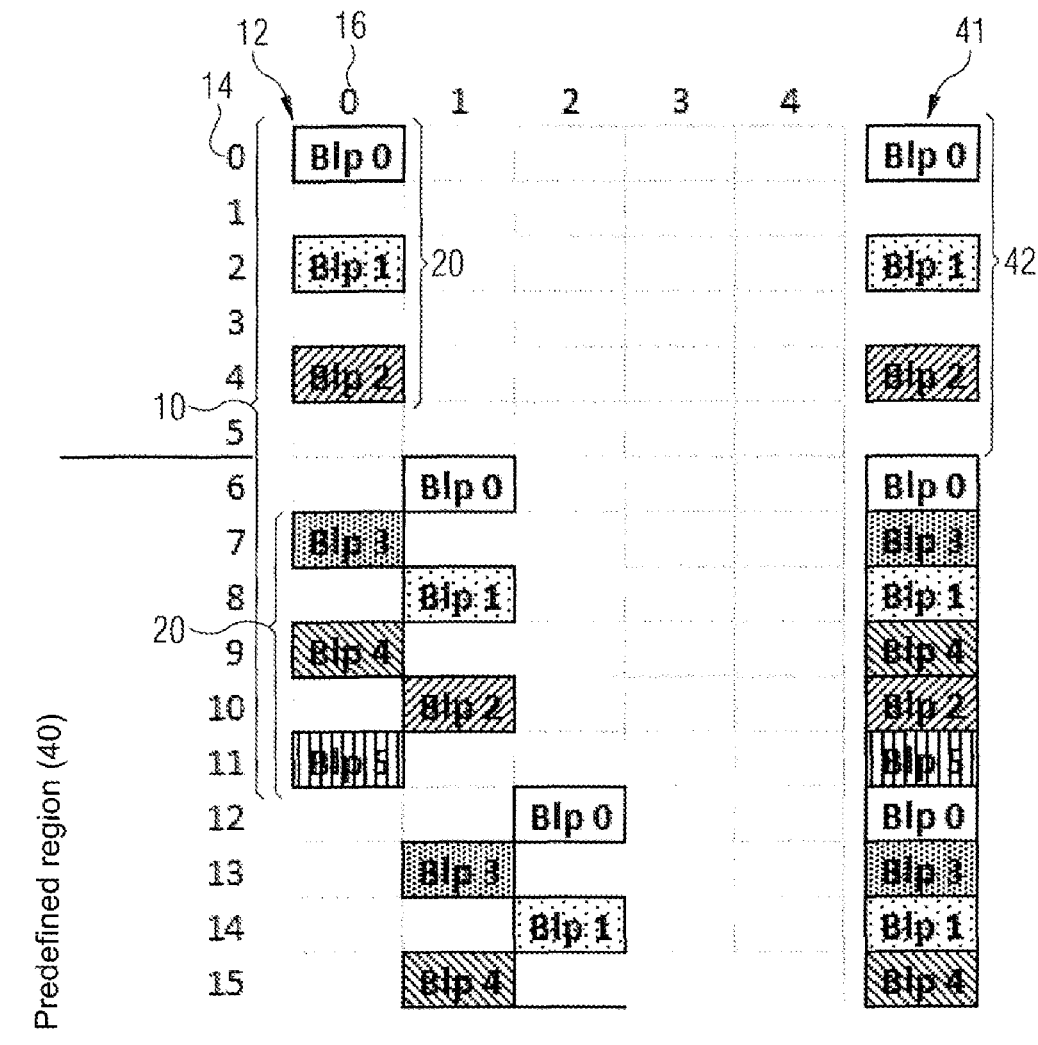
FIG. 7 includes FIGS. 7A and 7B and shows one exemplary embodiment of a method for scanning the sample with six illumination points, in which the number of groups of illumination points was set to two.
Figure 7B:
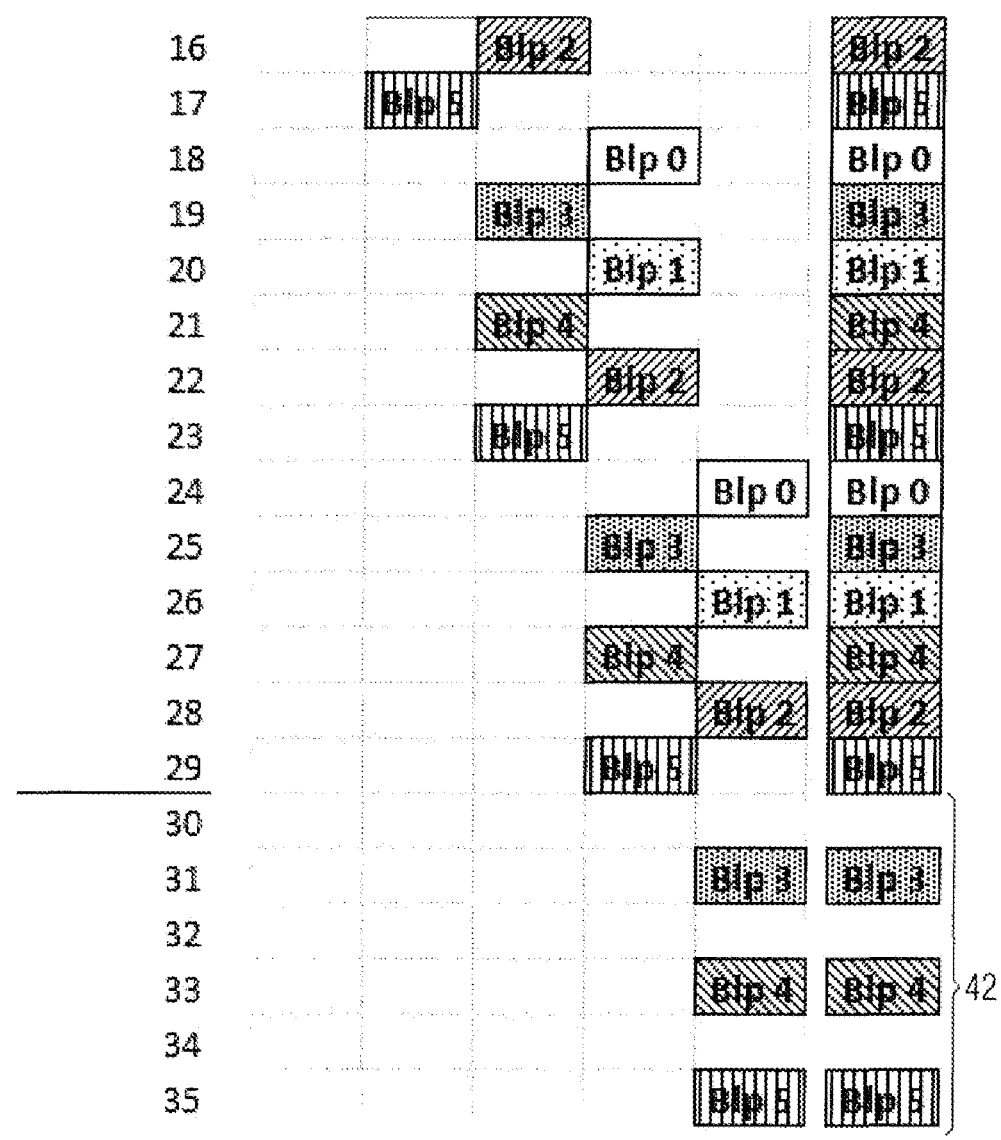

FIG. 7 shows one exemplary embodiment of the method for scanning the sample 100 with six illumination points 12, in which the number of groups 20 of illumination points 12 was set to two. Within the groups 20, the distance between two adjacent illumination points 12 is two scan lines 14, as in the exemplary embodiment mentioned above. Between the groups, the distance is three scan lines 14. Here, however, the step size is six scan lines 14 in each scan step 16. Here, too, gaps remain at the edge 42 of the illuminated region 41.

Figure 8A:
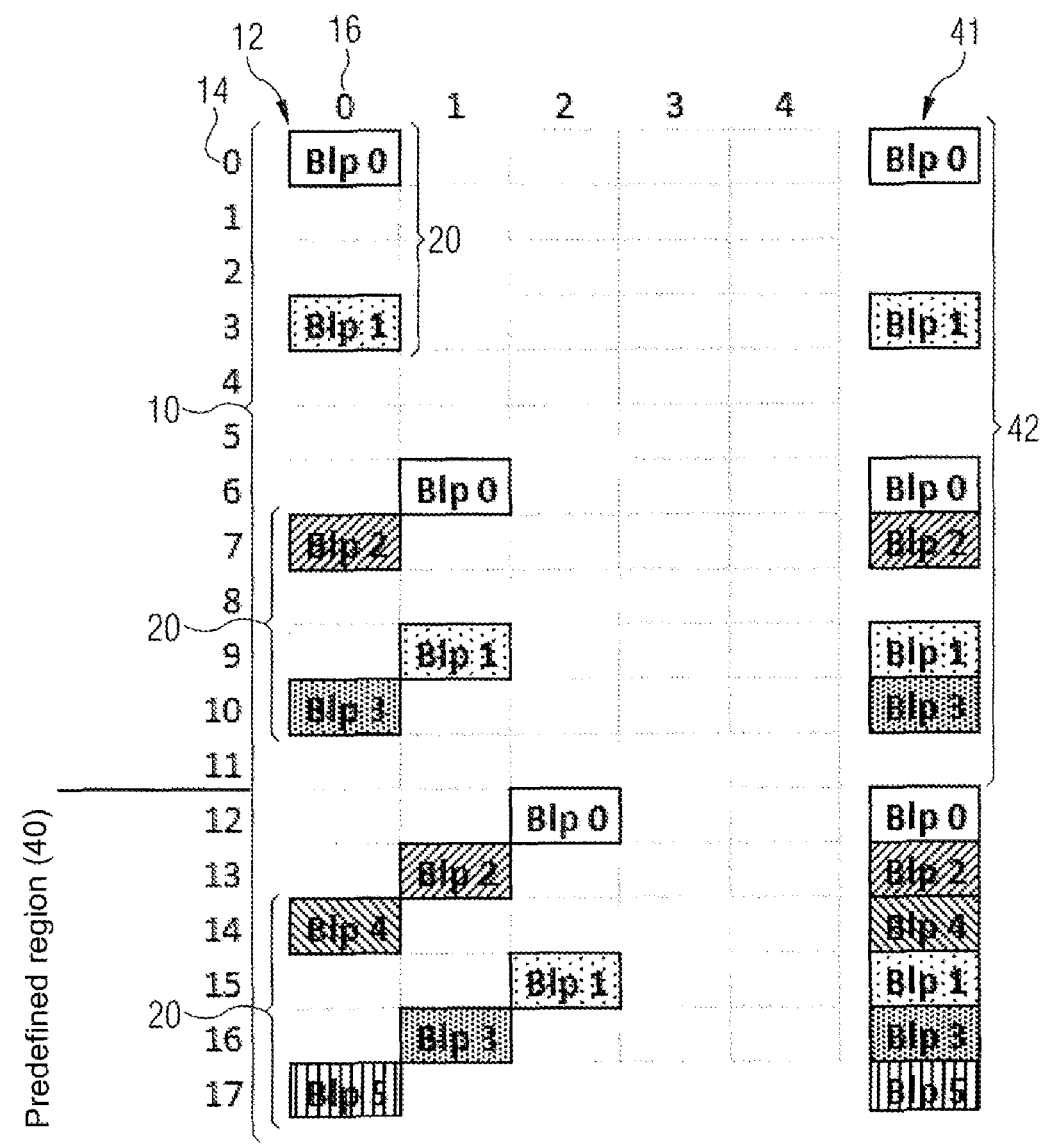
FIG. 8 includes FIGS. 8A and 8B and shows one exemplary embodiment of a method for scanning the sample with six illumination points, in which the number of groups of illumination points was set to three.
Figure 8B:
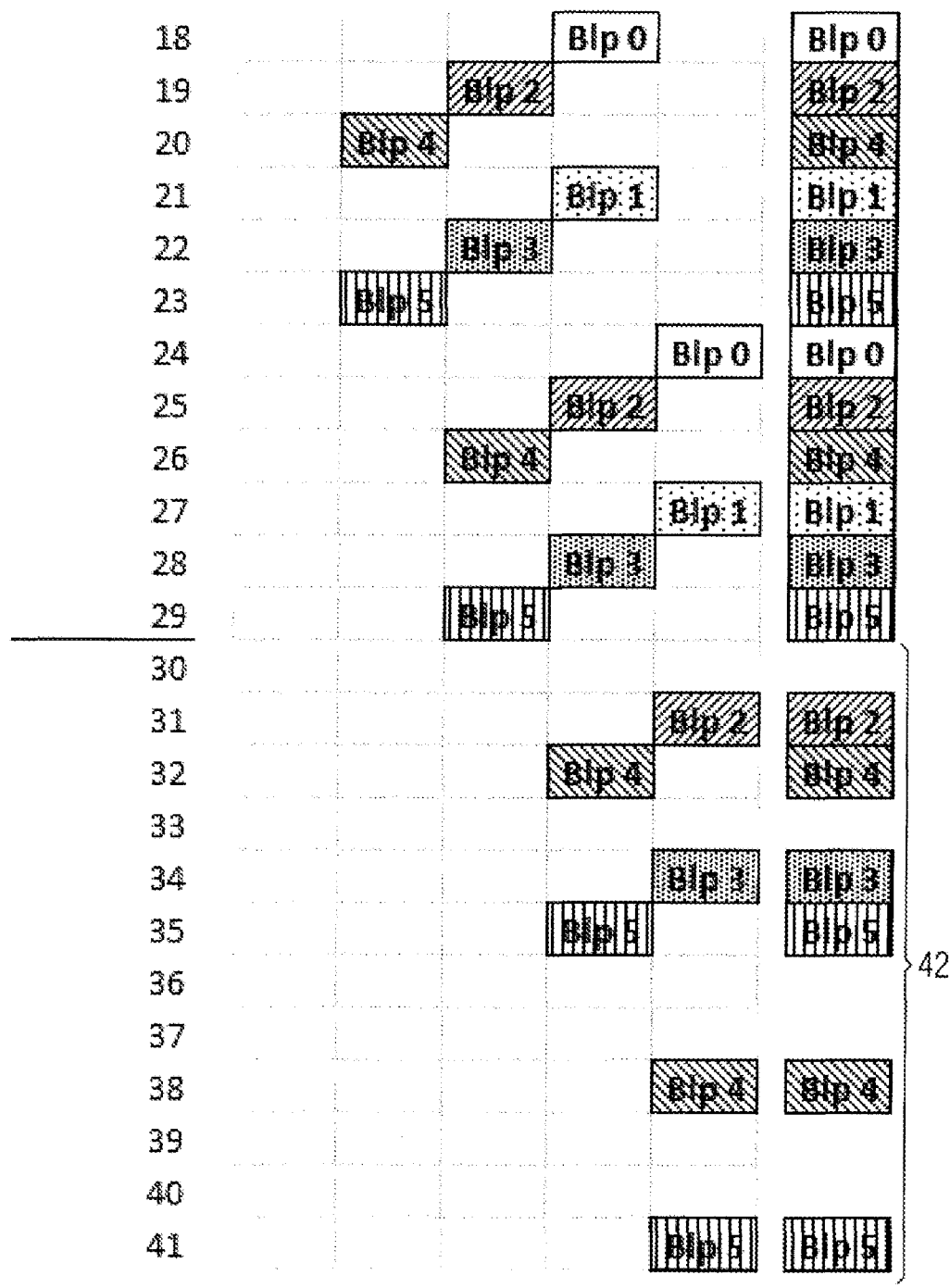

FIG. 8 shows one exemplary embodiment of the method for scanning the sample 100 with six illumination points 12, in which the number of groups 20 of illumination points 12 was set to three. Within the groups 20, the distance between two adjacent illumination points 12, corresponding to the number of groups 20, is three scan lines 14. Between the groups 20, the distance is four scan lines 14. The step size is six scan lines 14 in each scan step 16. Here, too, gaps remain at the edge 42 of the illuminated region 41.

Figure 9A:
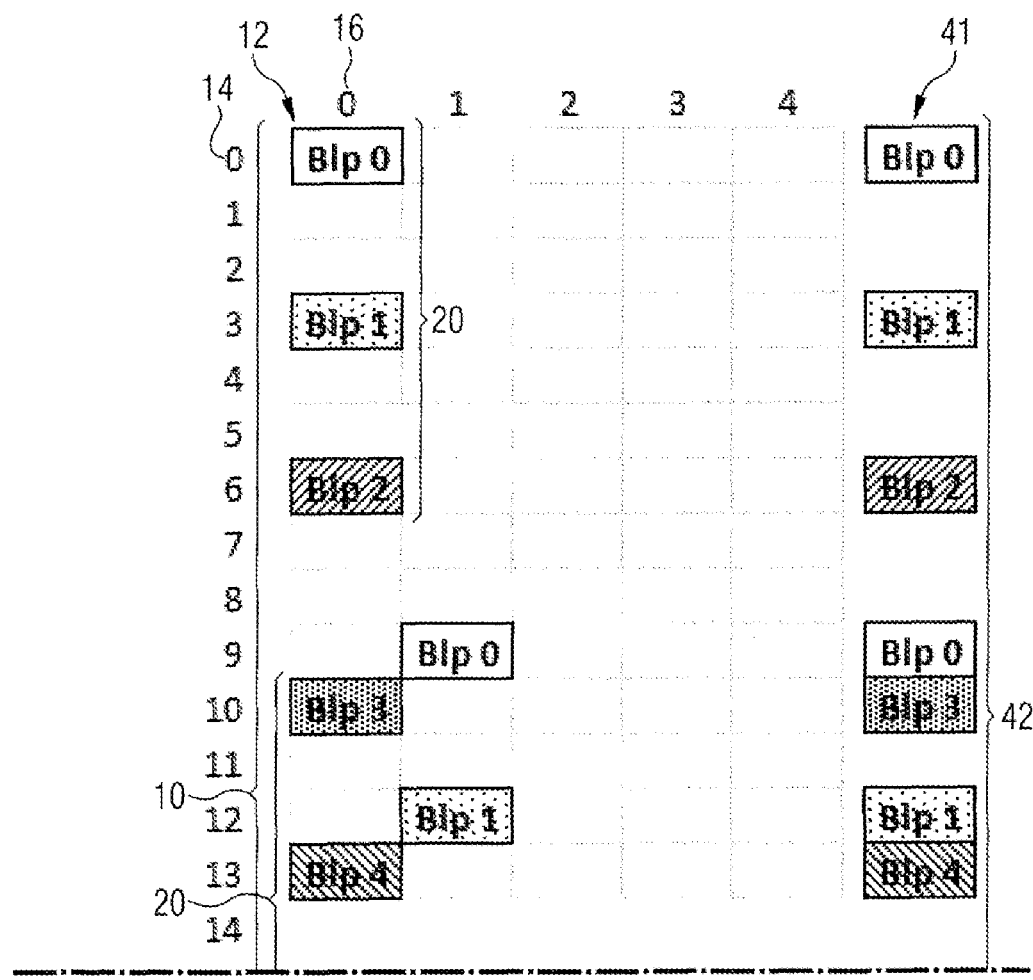
FIG. 9 includes FIGS. 9A-9C and shows one exemplary embodiment of a method for scanning the sample with nine illumination points, in which the number of groups of illumination points was set to three.
Figure 9B:
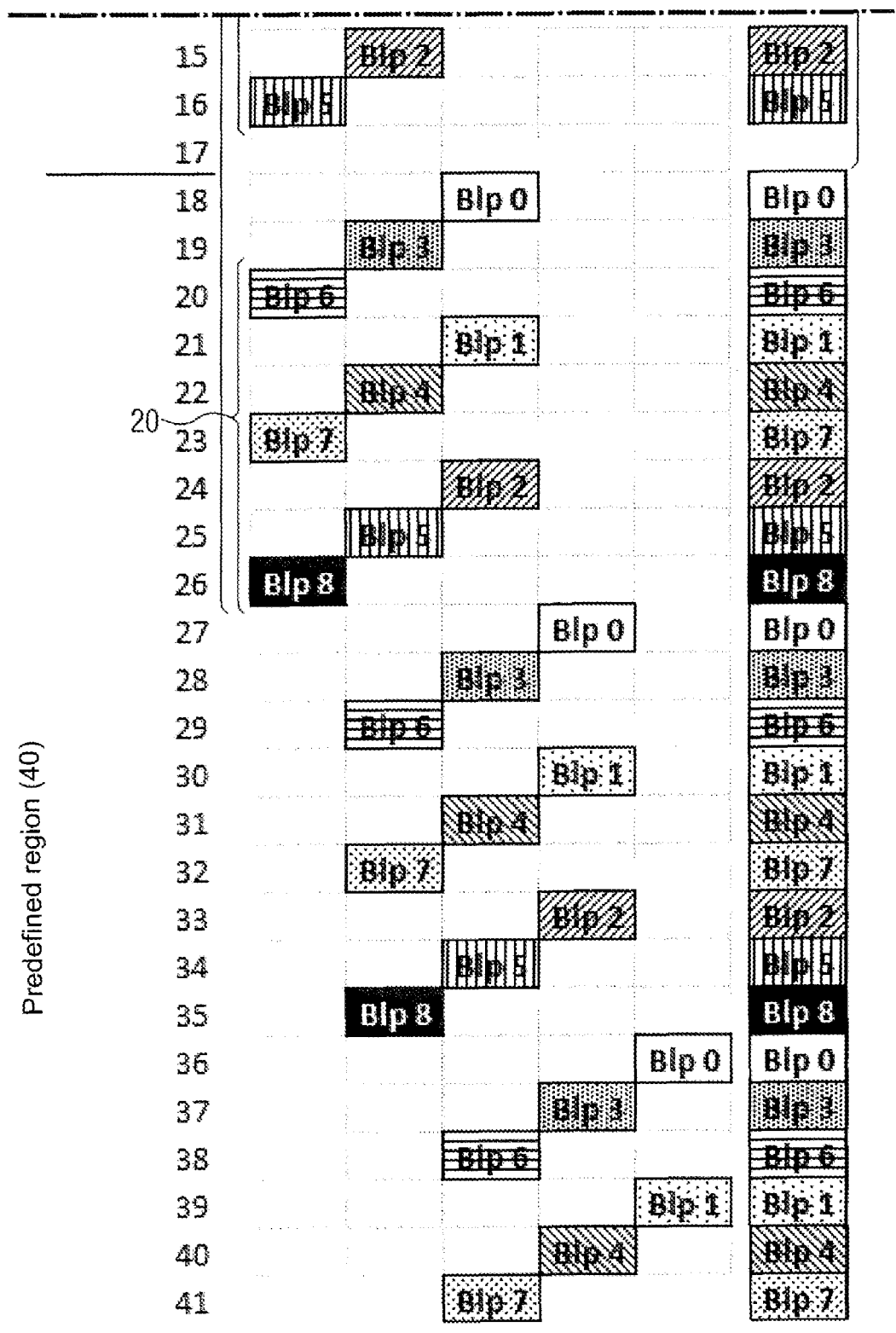
Figure 9C:
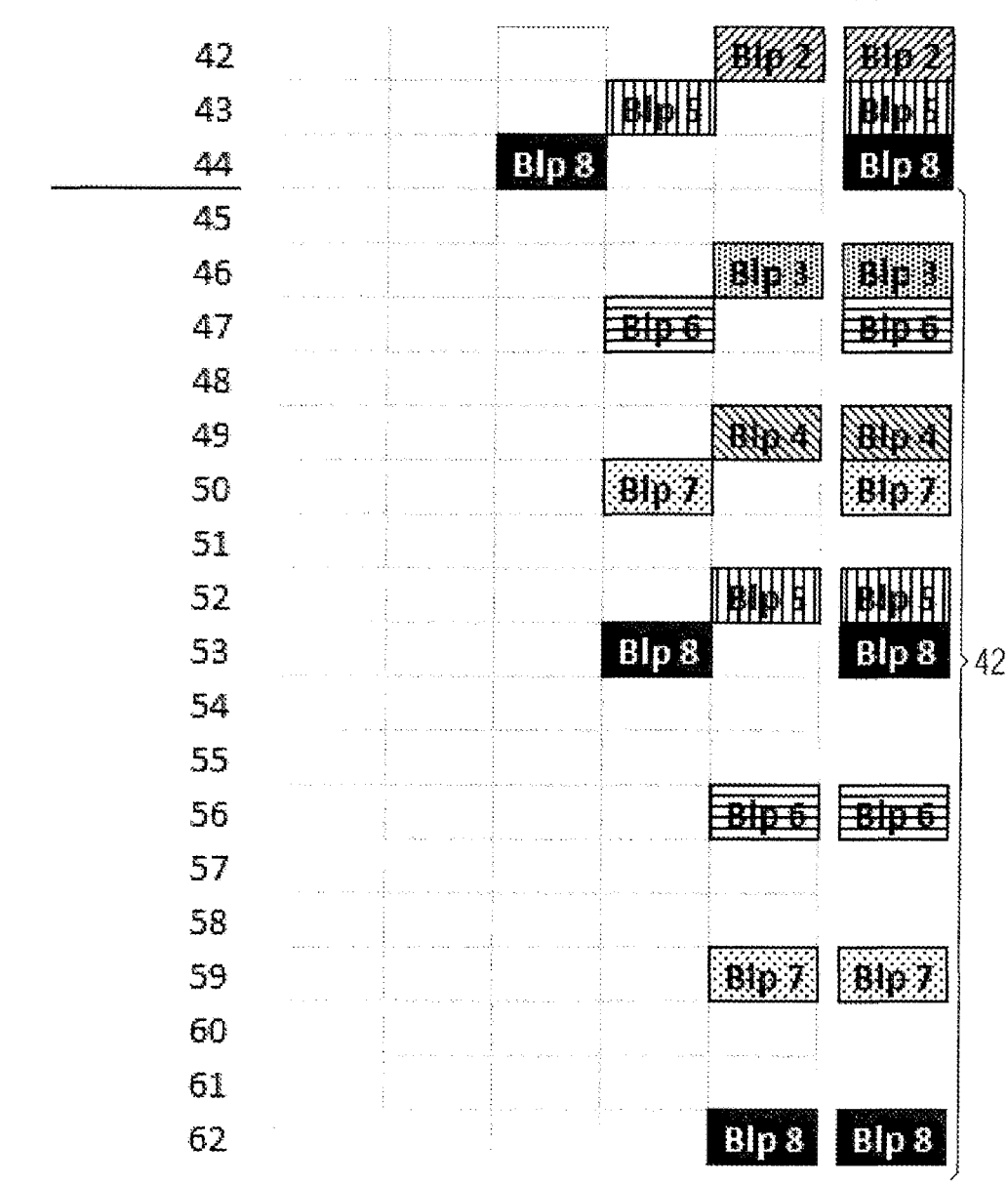

FIG. 9 shows one exemplary embodiment of the method for scanning the sample 100 with nine illumination points 12, in which the number of groups 20 of illumination points 12 was set to three. As in the exemplary embodiment mentioned above, the distance between two adjacent illumination points 12 within the groups 20 is three scan lines 14. Between the groups 20, the distance is four scan lines 14. Here, however, the step size is nine scan lines in each scan step 16. Here, too, gaps remain at the edge 42 of the illuminated region 41.

Figure 10A:
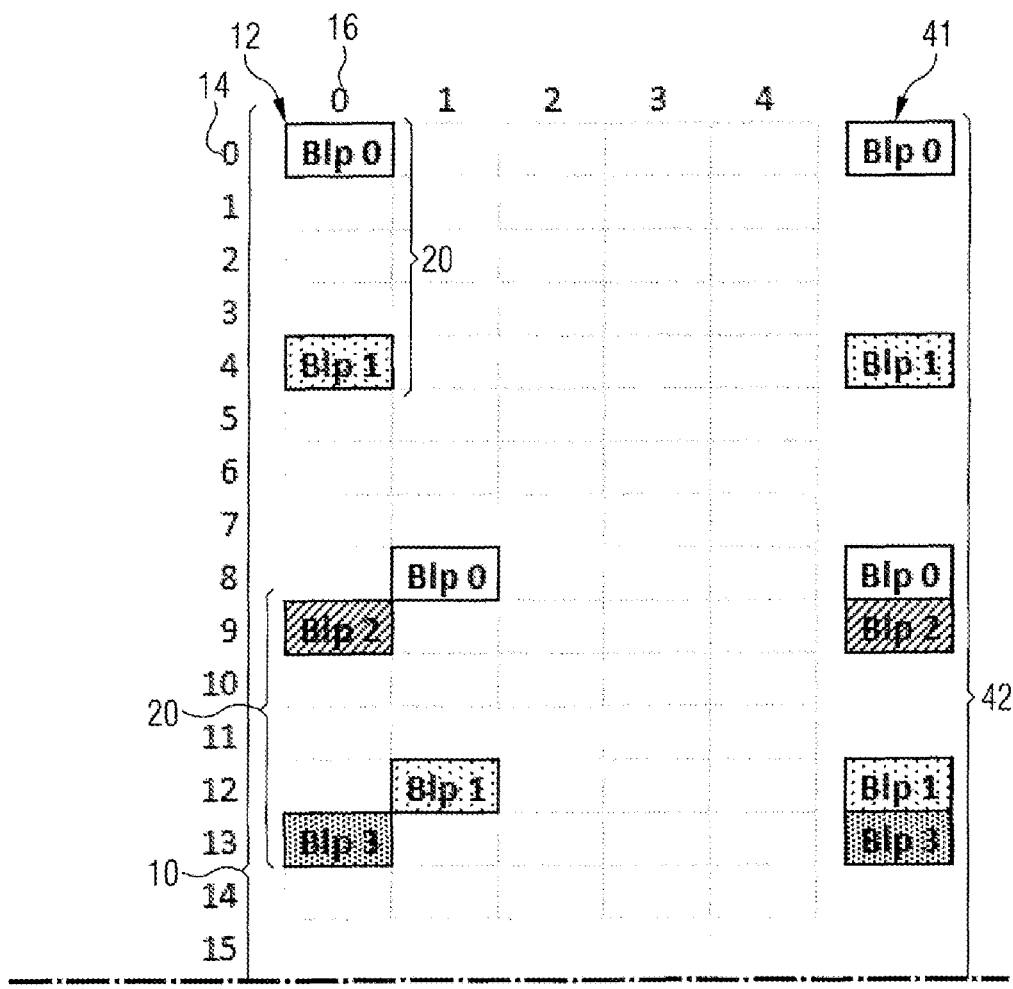
FIG. 10 includes FIGS. 10A-10C and shows one exemplary embodiment of a method for scanning the sample with eight illumination points, in which the number of groups of illumination points was set to four.
Figure 10C:
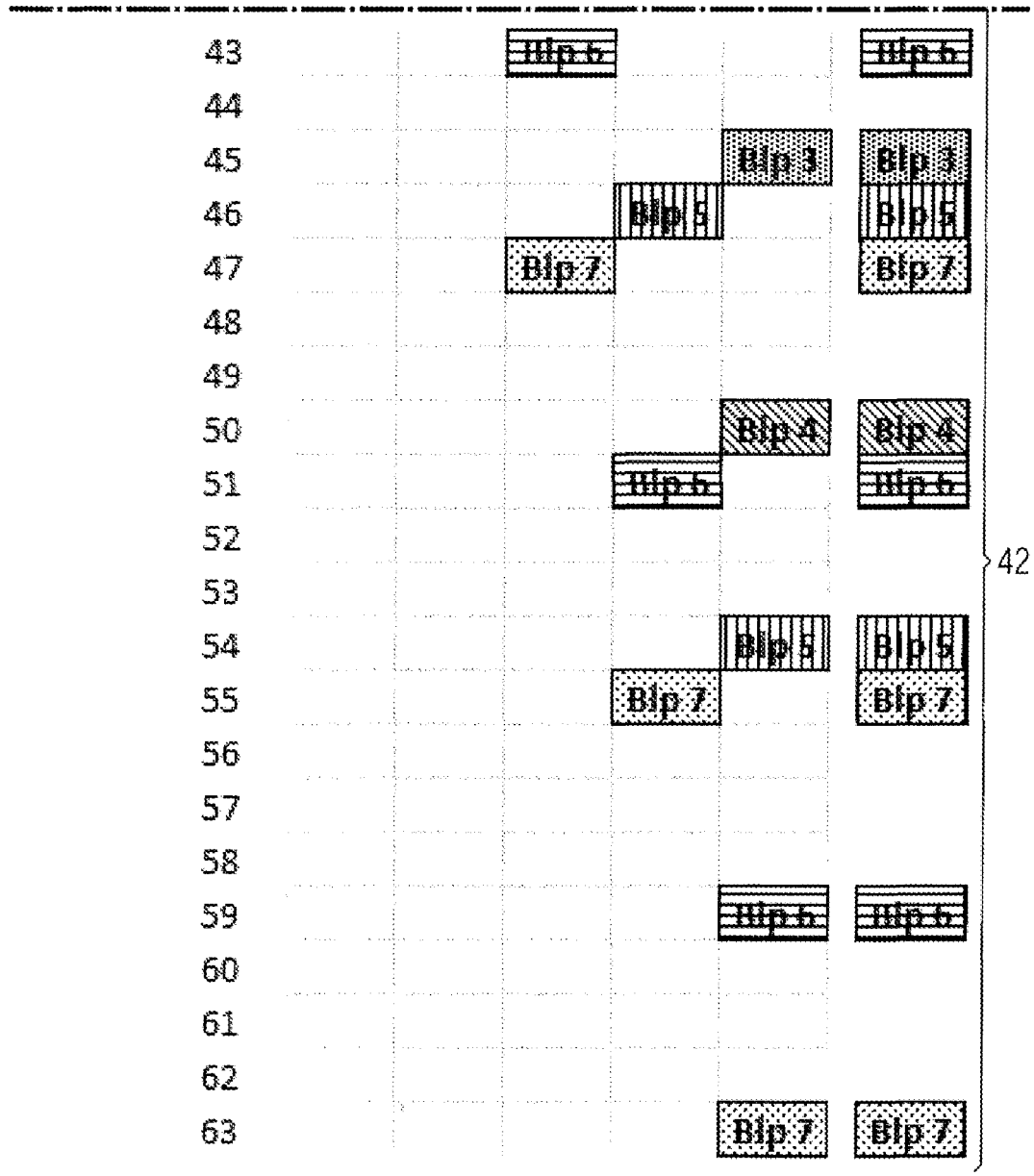

FIG. 10 shows one exemplary embodiment of the method for scanning the sample 100 with eight illumination points 12, in which the number of groups 20 of illumination points 12 was set to four. The distance between two adjacent illumination points 12 within the groups 20 is four scan lines 14. Between the groups 20, the distance is five scan lines. The step size is eight scan lines in each scan step 16. Here, too, gaps remain at the edge 42 of the illuminated region.

Figure 11:
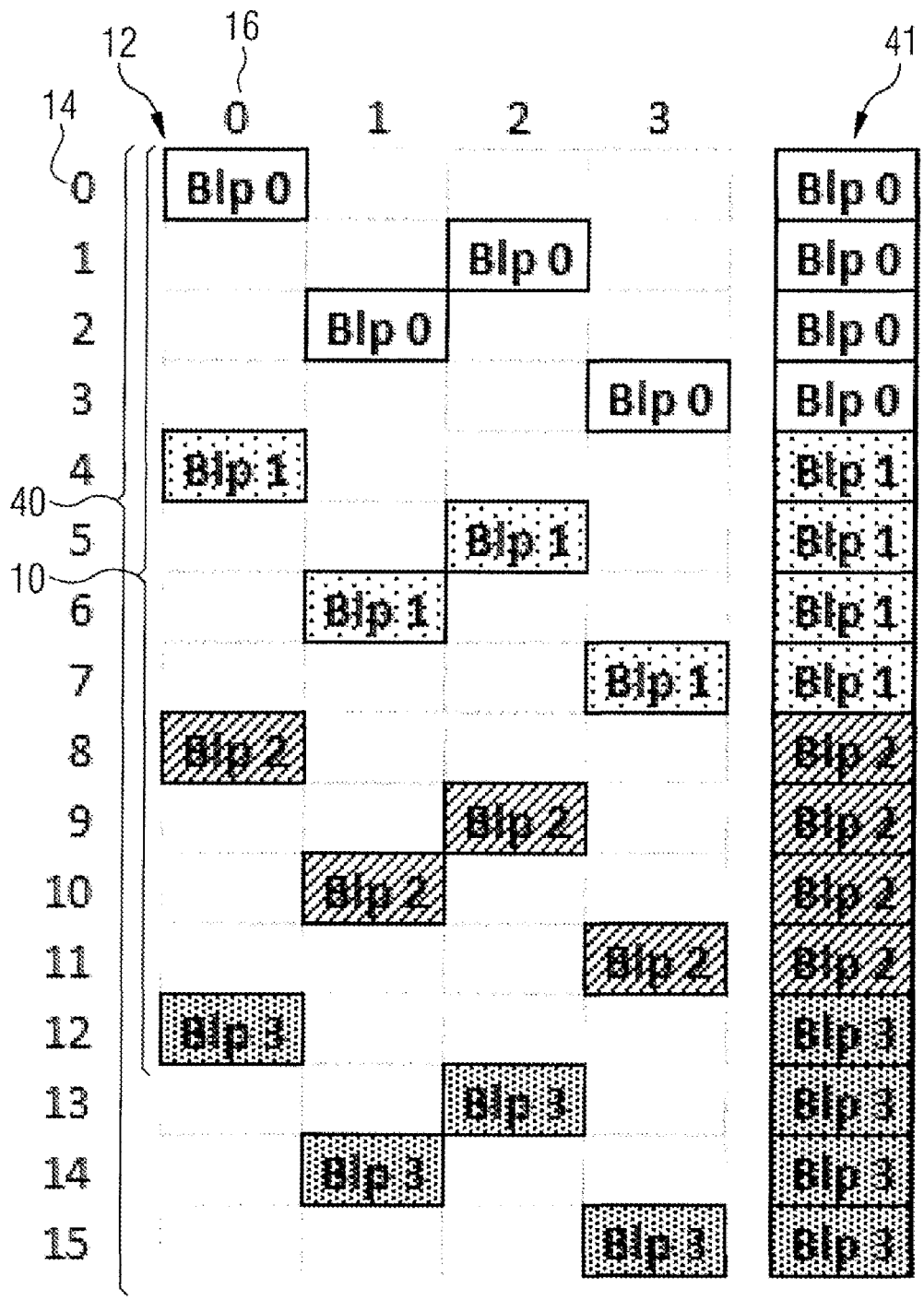
FIG. 11 shows one exemplary embodiment of a method for scanning the sample with four illumination points.

FIG. 11 shows one exemplary embodiment of the method for scanning the sample 100, in which the number of scan lines 14 along the second direction by which the point pattern 10 is moved in each scan step 16 is different in successive scan steps 16. In this case, the point pattern 10 is moved in opposite directions in successive scan steps 16, such that the point pattern 10 jumps back and forth as it were along the second direction. What can be achieved as a result is that the scanned region of the sample 100 becomes refined further and further as it were in successive scan steps 16. This is advantageous since it is thus possible to carry out an adaptation to the effect of whether the predefined region 40 of the sample 100 is scanned with a high resolution, which requires more scan steps 16, or whether the duration of the method for scanning the sample 100 is shortened by fewer scan steps 16 being carried out.

With reference to FIGS. 2 to 11, a plurality of exemplary embodiments of the method for scanning a sample 100 have been described, which can be particularly advantageous under various boundary conditions. Besides the number of illumination points 12, each of the exemplary embodiments has at least one further freely selectable parameter "m". For differentiation, here use is also made of the notation D2, D3, D4, . . . , Dm for the exemplary embodiments described in FIGS. 2 to 5 and C2, C3, C4, . . . , Cm for the exemplary embodiments described in FIGS. 6 to 10. The multiplicity of possible combinations in accordance with exemplary embodiments, in particular of the number of illumination points 12 and freely selectable parameter "m", results in great flexibility, such that an optimum mode can be set for a variety of initial situations (i.e. predefined region 40, properties of a scanning device 60, etc.).

Figure 12:
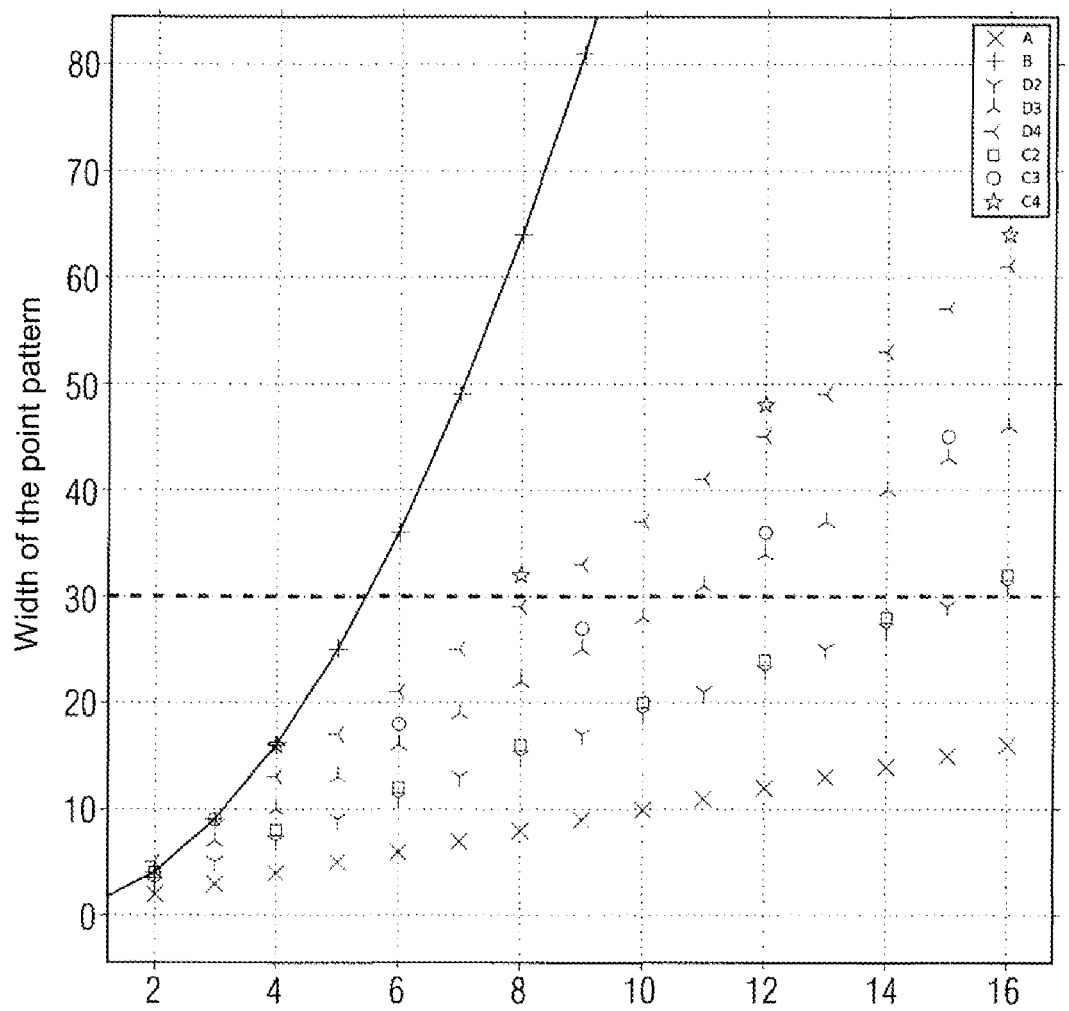
FIG. 12 shows a graph which compares various exemplary embodiments of a method for scanning the sample and methods according to the prior art with one another.

FIG. 12 shows a graph which compares various exemplary embodiments of the method for scanning the sample 100 and methods according to the prior art with one another. The graph shows the total width of the point pattern 10 measured in scan lines 14 as a function of the number n of illumination points 12 for various modes D2, D3, D4 and C2, C3, C4 of the method and two modes A and B known from the prior art, which are explained in greater detail further below in association with FIG. 16 and respectively FIGS. 18 and 19.

FIG. 12 clearly reveals that a flexible choice of the distance between two adjacent illumination points 12 is possible both with mode D and with mode C. If the optical system allows for example a maximum width of the point pattern 10 of 30 scan lines (dashed line), for a number n= 8 . . . 16 of illumination points 12 it is possible to set a mode so as to result in a maximum distance between two adjacent illumination points 12 under the given circumstances.

Furthermore, FIG. 12 clearly reveals that mode D is even more flexible than mode C since all modes D2, D3, . . . can be set for each set number of illumination points 12. However, mode D has the disadvantage visa vis mode C that the step size of a scan step 16 can become very large. In mode C, said step size in scan lines 14 is always equal to the number of illumination points 12, while in mode D it is equal to the product of the number of illumination points 12 and the distance—indicated in scan lines 14—between adjacent illumination points 12. Consequently, the step size of a scan step 14 in mode D is at least double the size in mode C if the freely selectable parameter is set to the same value. Furthermore, mode D requires a plurality of scan passes in order to establish an individual image from the scanning. The maximum rate of methods that can be carried out per unit of time is limited as a result.

Figure 13:
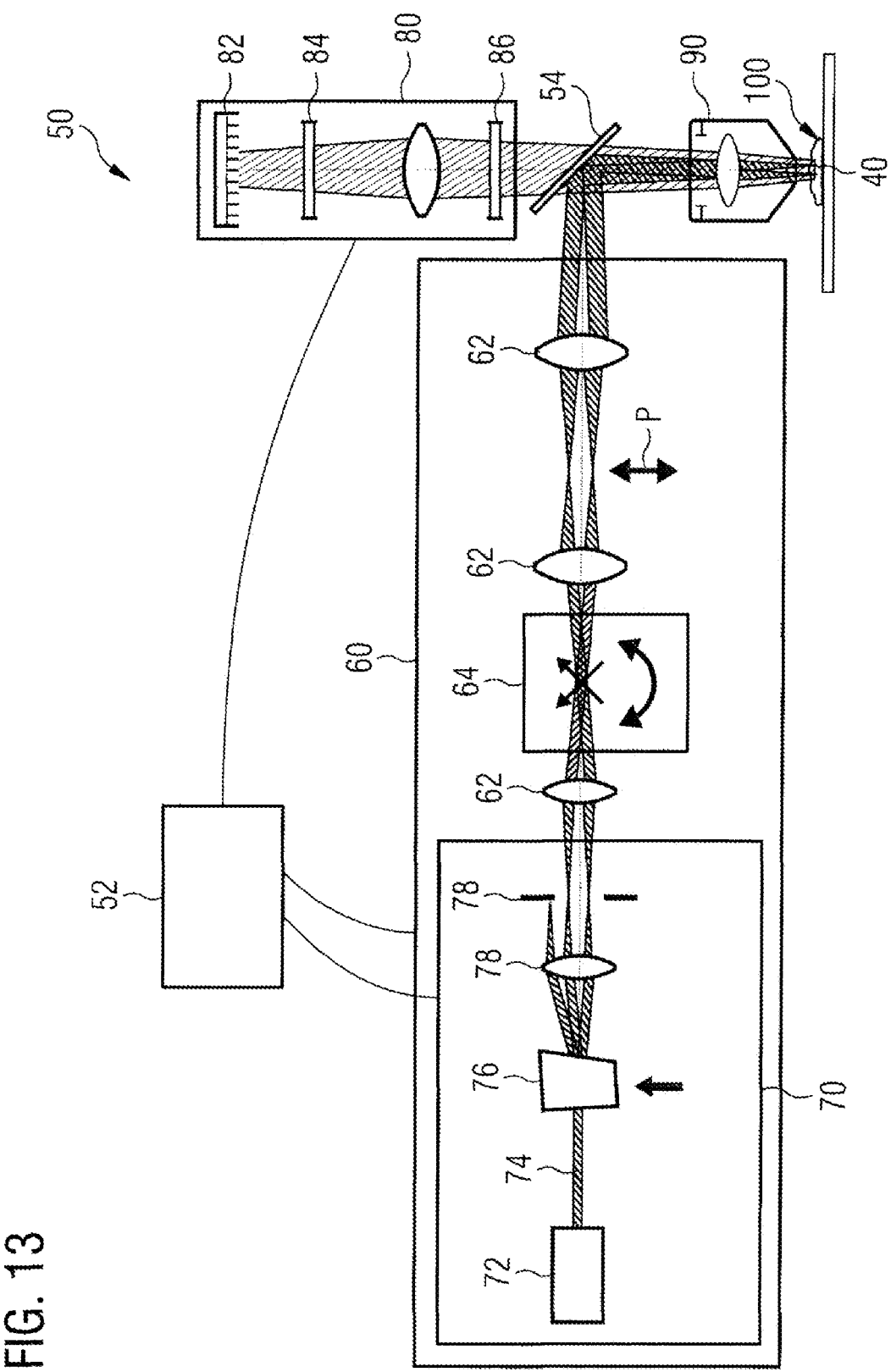
FIG. 13 shows one exemplary embodiment of a microscope with camera detection.

FIG. 13 shows one exemplary embodiment of a microscope 50. The microscope 50 comprises a control unit 52, a scanning device 60, with the aid of which the method according to the invention can be carried out, a dichroic mirror 54, a detection unit 80 and an objective optical unit 90. A sample 100 is able to be introduced into the microscope 50.

The scanning device 60 comprises an illumination unit 70 for generating illumination points 12, deflection elements for scanning the predefined region 40, which here are generally designated by 64, such as, for example, galvanometer mirrors, and further optical elements, which here are generally designated by 62, such as, for example, lenses, lens systems and stops.

The illumination unit 70 comprises a light source 72, which generates an illumination light beam 74, a unit 76 for splitting the illumination light beam 74 into a number—settable by an operator—of illumination points 12, for example a beam splitter or an AOD, and a plurality of further optical elements, which here are generally designated by 78, such as, for example, lenses, lens systems and stops. By way of example, the illumination unit 70 can comprise a second unit for splitting the illumination light beam 74 further. As a result, even more complex two-dimensional point patterns 10 can be generated. The illumination light beam 74 generated by the light source 72 can be, in particular, a beam of light (e.g. laser light) which excites the sample 100 to emit fluorescent light.

In particular, the unit 76 for splitting the illumination light beam 74 and the further optical elements 78 of the illumination unit 70 are controlled by the control unit 52 in such a way that from the illumination points 12 a point pattern 10 is generated in accordance with the at least one free parameter set. Preferably, the light source 72 is also controlled by the control unit 52, such that it can be blanked ("blanking"), for example.

The detection unit 80 comprises a camera sensor 82, a bandpass filter 84 and a multi-photon block 86. The camera sensor 82 is embodied in such a way as to detect the detection light emanating from the sample 100. Preferably, the camera exposure time and release rate of the camera sensor 82 are set by the control unit 52. The bandpass filter 84 filters all wavelengths apart from a preset wavelength range out of the detection light emanating from the sample 100. The preset wavelength range can be for example the wavelength range of the fluorescent light of a specific dye. As a result, only regions of the sample 100 in which the specific dye is present can be imaged with the aid of the camera sensor 82. The multi-photon block 86 is preferably formed by a short-pass filter. The multi-photon block 86 prevents excitation light from reaching the camera sensor 82.

The beam path of the microscope 50 according to FIG. 13 will be outlined briefly below: the point pattern 10 generated by the illumination unit 70 is moved along a first direction and along a second direction by means of the deflection elements 64 of the scanning device 60. The movement of the point pattern 10 is indicated by a double-headed arrow P in FIG. 13. As a result, after the point pattern 10 has passed through the dichroic mirror 54 and the objective optical unit 90, different points lying substantially within the predefined region 40 of the sample 100 are illuminated. Detection light emanating from the sample 100 is incident in the detection unit 80 after passing through the objective optical unit 90 and the dichroic mirror 54.

Figure 14:
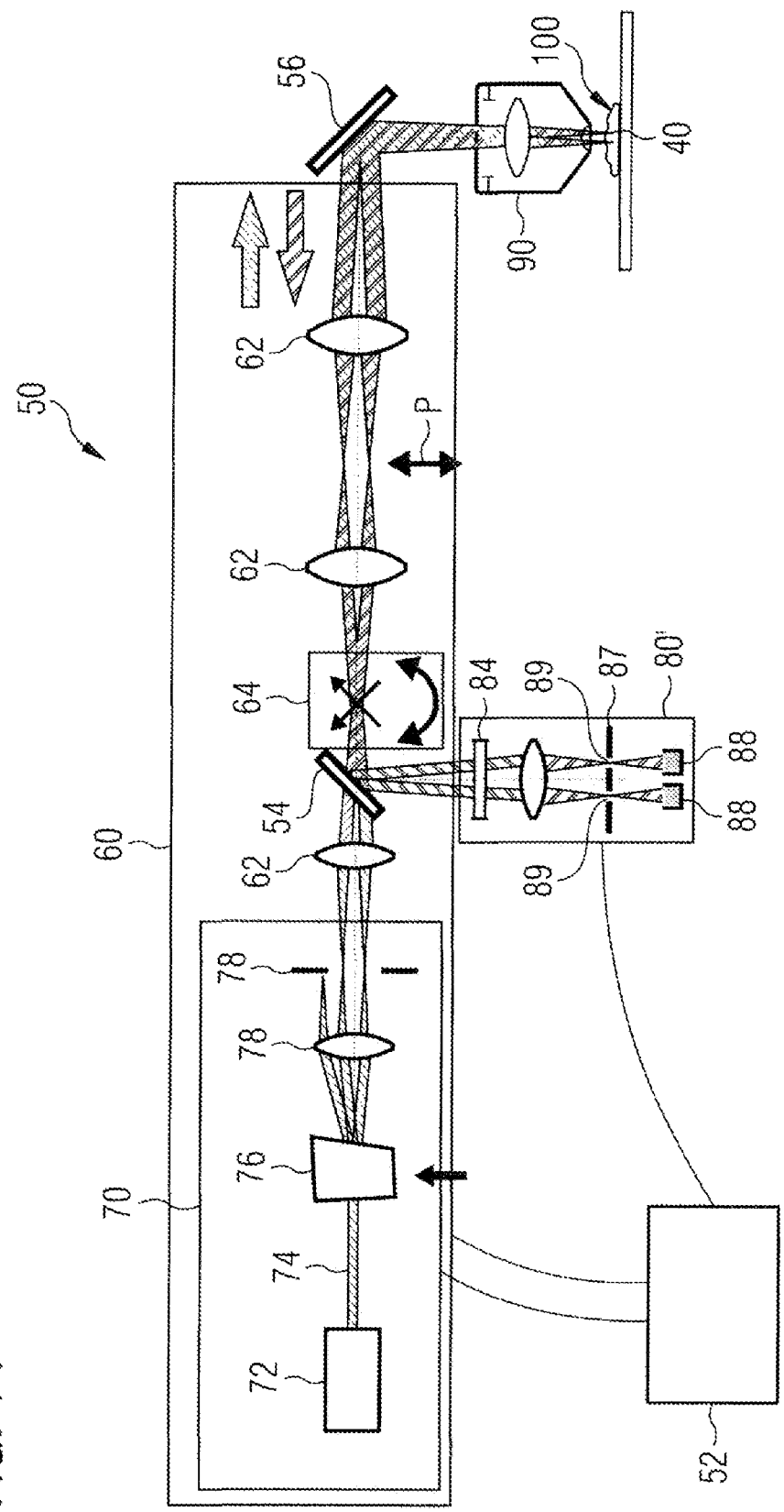
FIG. 14 shows a further exemplary embodiment of a microscope embodied as a confocal microscope.

FIG. 14 shows a further exemplary embodiment of the microscope 50. The microscope 50 shown in FIG. 14 differs from the microscope 50 shown in FIG. 13 essentially in a pinhole stop detection unit 80', which replaces the detection unit 80 with the camera sensor 82. Furthermore, the microscope 50 according to FIG. 14 comprises a deflection mirror 56 arranged between the scanning device 60 and the objective optical unit 90.

The pinhole stop detection unit 80' comprises a bandpass filter 84, point detectors 88 and an array 87 of pinhole stops 89. The array 87 of pinhole stops 89 is embodied in such a way that the pinhole stops 89 can be opened or closed under the control of the control unit 52. The control unit 52 controls the array 87 in particular depending on the point pattern 10 respectively set. Preferably, in this case, an illumination point 12 of the point pattern 10 is assigned to each opened pinhole stop 89. Instead of an array 87 of pinhole stops 89, the microscope 50 can also comprise a micromirror actuator having a micromirror array, which fulfils the same function.

The beam path of the microscope 50 according to FIG. 14 will be outlined briefly below: the point pattern 10 generated by the illumination unit 70 is incident on the deflection mirror 56 after passing through the dichroic mirror 54 and the further optical elements 62 of the scanning device 60. The deflection mirror 56 directs the point pattern 10 onto the objective optical unit 90. By means of the objective optical unit 90, different points lying substantially within the predefined region 40 of the sample 100 are illuminated with the aid of the point pattern 10. Detection light emanating from the sample 100 is incident on the deflection mirror 56 after passing through the objective optical unit 90. The deflection mirror 56 directs the detection light through the further optical elements 62 of the scanning device 60 onto the dichroic mirror 54. The detection light emanating from the sample 100 is directed into the pinhole stop detection unit 80' by the dichroic mirror 54.

The detection light passes through the deflection elements 64 and the further optical elements 62 of the scanning device 60 in the opposite direction to the point pattern 10. Between the sample 100 and the deflection elements 64, the detection light effects a movement along the first direction and the second direction that follows the movement of the point pattern 10. The movement of the point pattern 10 is indicated by a double-headed arrow P in FIG. 14. Upon passing through the deflection elements 64 of the scanning device 60, the detection light is "descanned". In particular, the detection beam passing between the deflection elements 64 and the point detectors 88 is referred to as "descanned" since the scanning or scan movement is cancelled again when the detection light returns. This ensures that the detection light assigned to one of the illumination points 12 is always incident on one of the point detectors 88 through the pinhole stop 89 assigned to the aforementioned illumination point 12.

Figure 15:
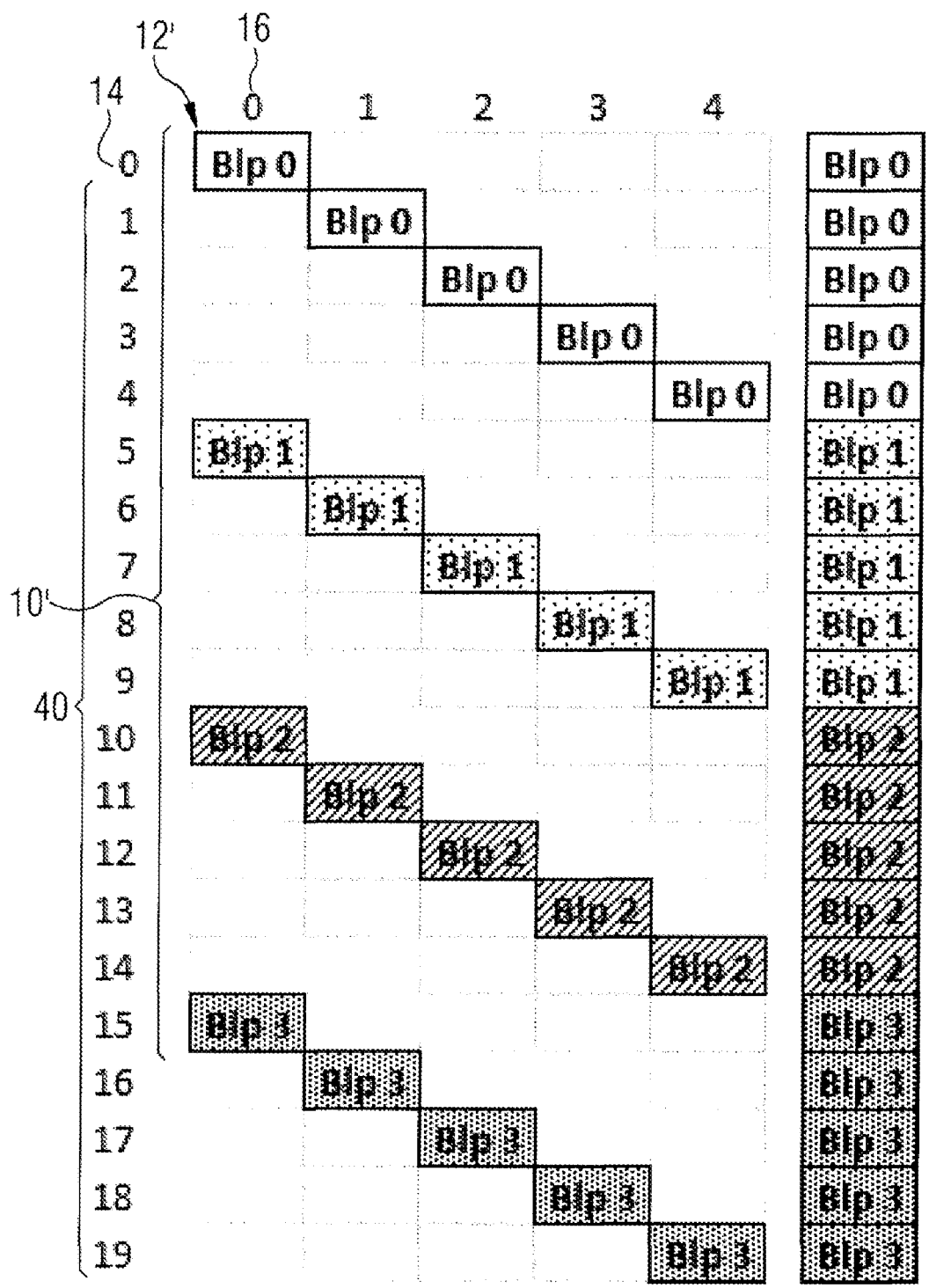
FIG. 15 shows a method for scanning a sample according to the prior art.

FIG. 15 shows a method for scanning the sample 100 according to the prior art. The point pattern 10' is formed by four illumination points 12' and extends over a large part of the predefined region 40 of the sample 100 along the second direction. The illumination points 12' are arranged equidistantly. In the direction of the second direction successive scan lines 14 are scanned in a plurality of scan steps 16 until the predefined region 40 is completely scanned.

Figure 16:
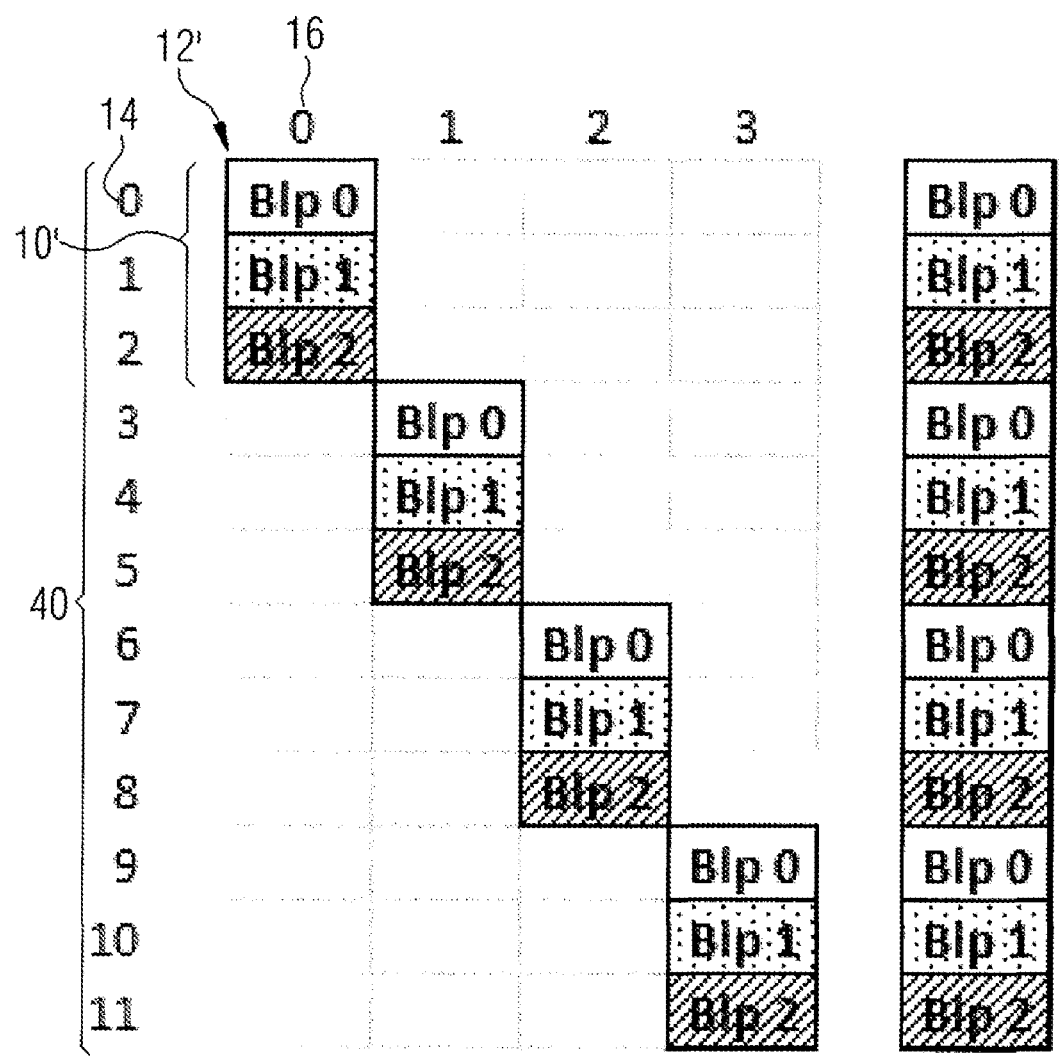
FIG. 16 shows a further method for scanning the sample according to the prior art.

FIG. 16 shows a further method for scanning the sample 100 according to the prior art. The point pattern 10' is formed by three illumination points 12' arranged successively at a distance of one scan line 14. As a result, an illumination spot is effectively generated which is wider than the individual illumination points 12'. With the aid of the point pattern 10', the predefined region 40 is scanned completely in a plurality of scan steps 16, wherein the step size is three scan lines 14. This method is referred to as mode A in FIG. 12.

Figure 17:
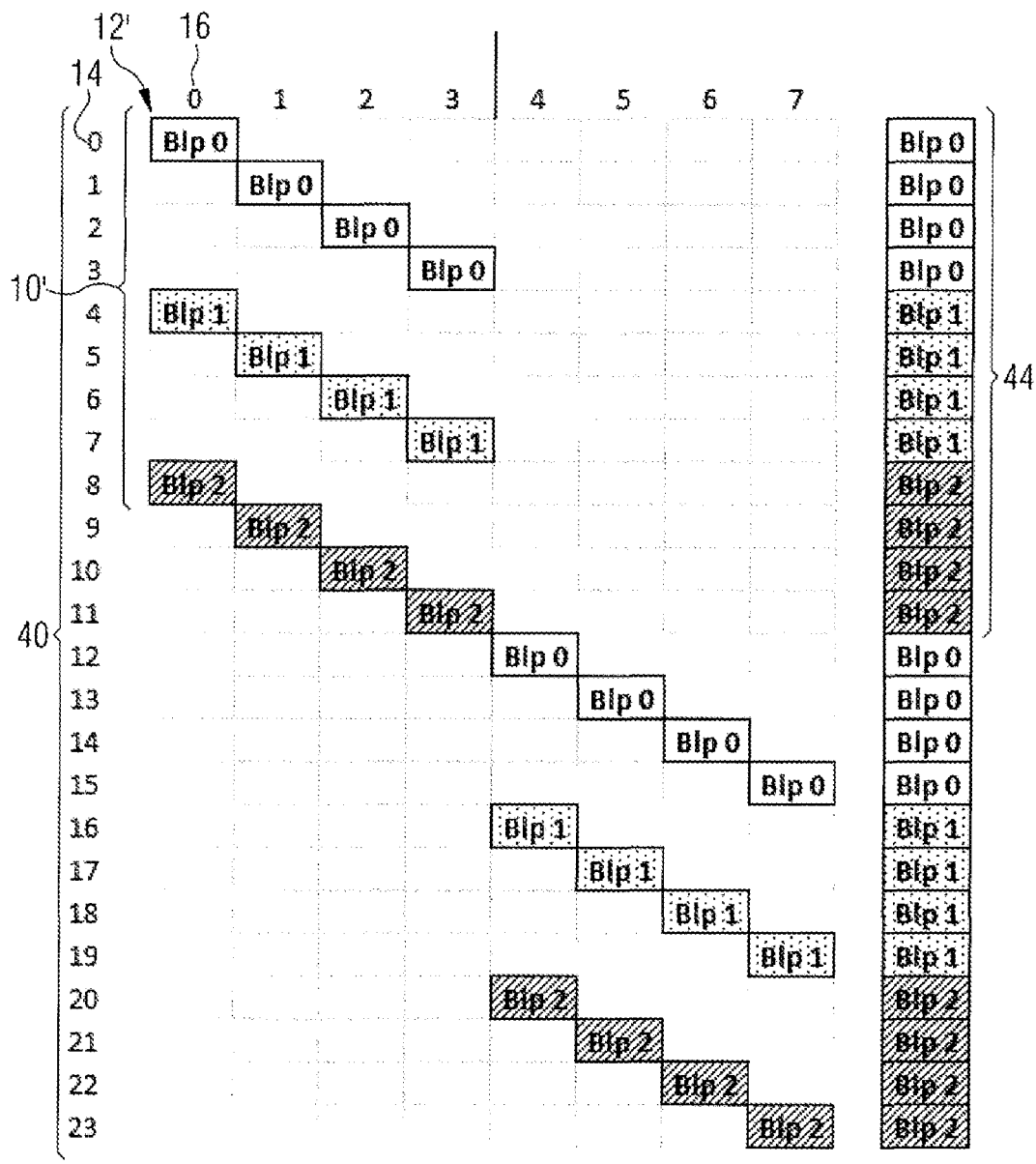
FIG. 17 shows a further method for scanning the sample according to the prior art.

FIG. 17 shows a further method for scanning the sample 100 according to the prior art. The point pattern 10' is formed by three illumination points 12' arranged equidistantly along one direction. Along one direction successive scan lines 14 of a portion 44 of the predefined region 40 are scanned in a plurality of scan steps 16. This is repeated for further portions 44 of the predefined region 40 that are arranged along the aforementioned direction, such that the predefined region 40 can be constituted from the predetermined portions 44.

Figure 18:
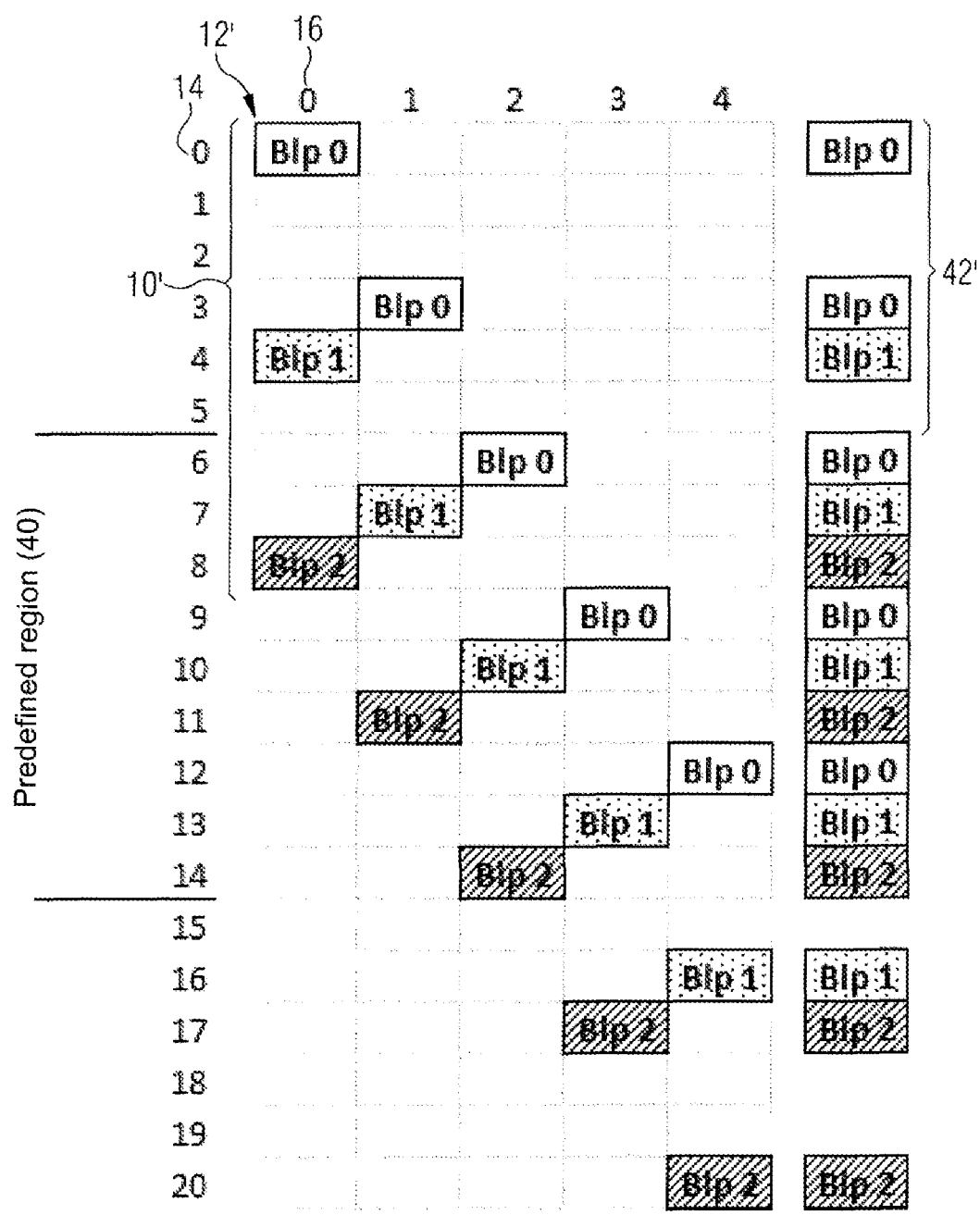
FIG. 18 shows a further method for scanning the sample according to the prior art with three illumination points.
Figure 19A:
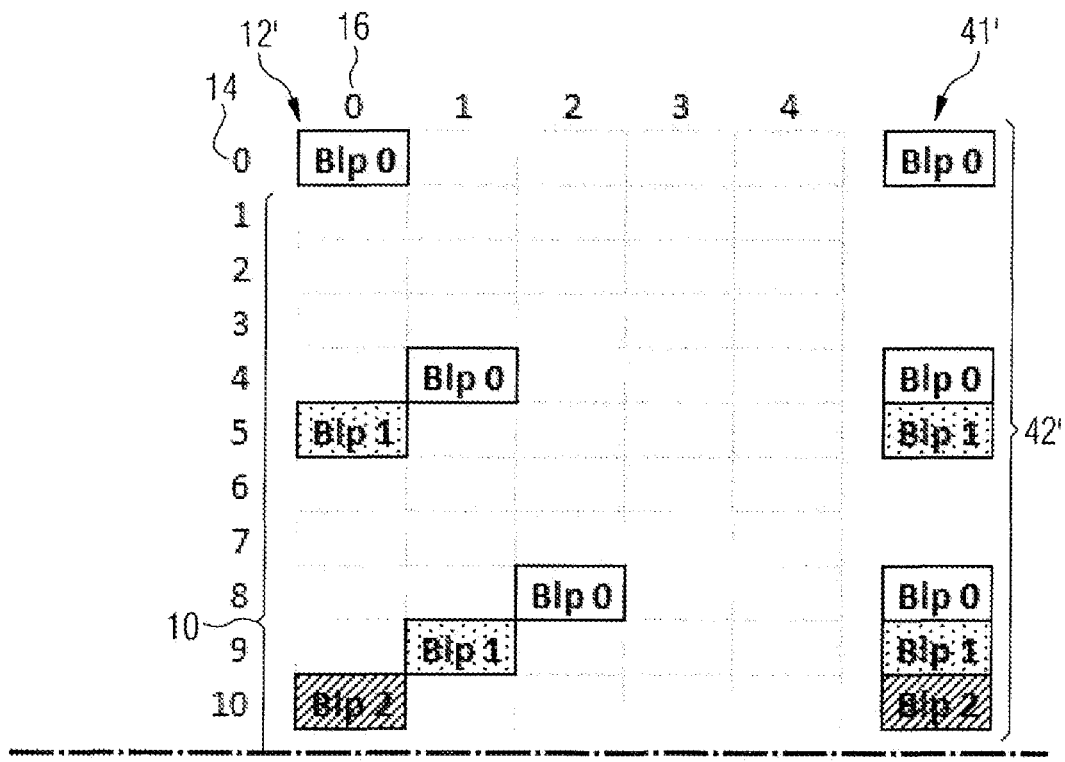
FIG. 19 includes FIGS. 19A and 19B and shows the known method for scanning the sample according to FIG. 18 with four illumination points.
Figure 19B:
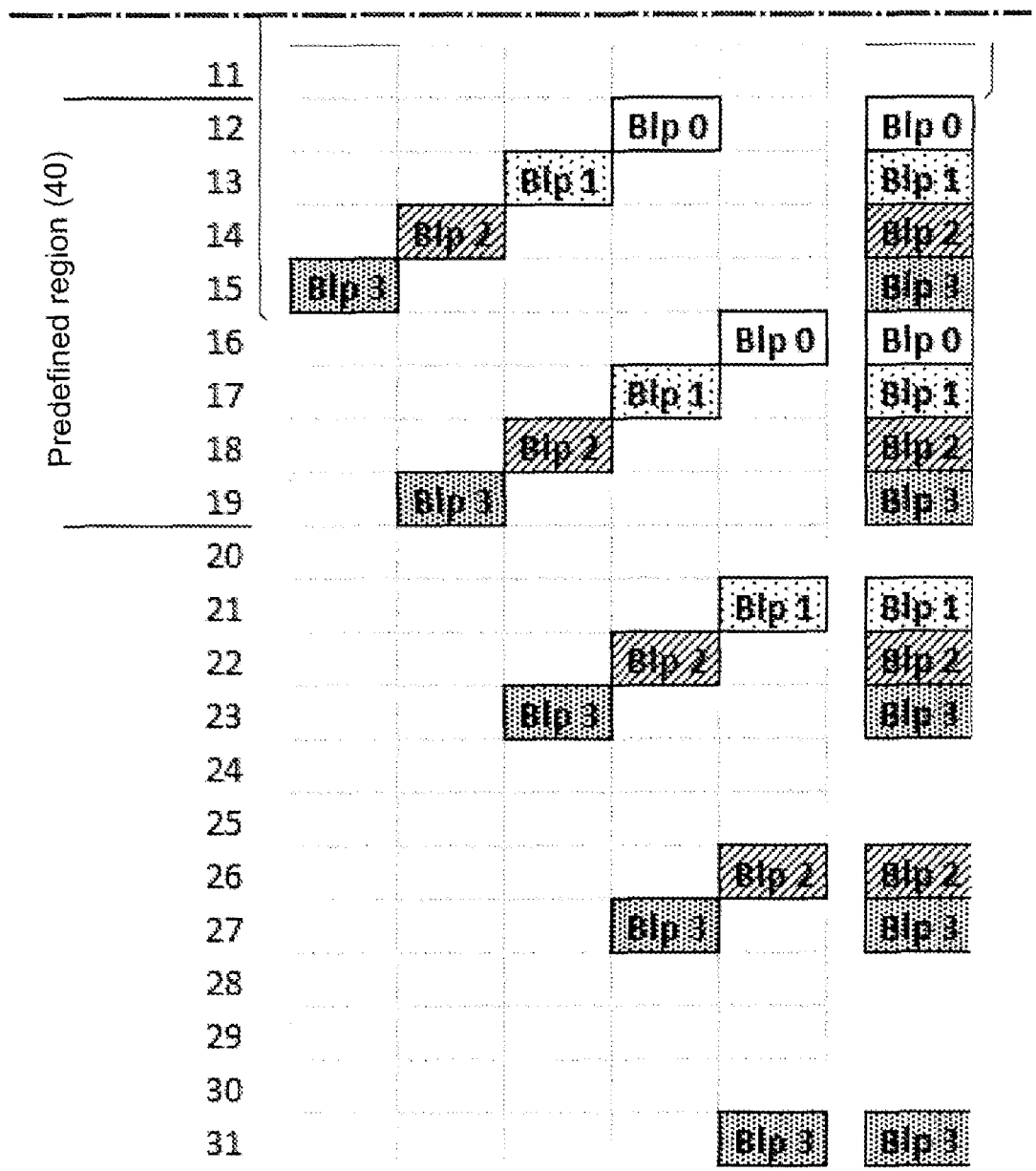

FIGS. 18 and 19 show a further method for scanning the sample 100 according to the prior art, in which the distance in scan lines 14 between two adjacent illumination points 12' of the point pattern 10' is equal to the sum of the number of illumination points 12' of the point pattern 10' and one. Successive scan lines 14 are scanned in a plurality of scan steps 16. A number of scan lines 14 that is equal to the number of illumination points 12' of the point pattern 10' are skipped in each scan step 16. Gaps remain at the edge 42' of the region 41' scanned overall. This method is designated as mode B in FIG. 12. In the exemplary embodiment shown in FIG. 18, the point pattern 10' is formed by three illumination points 12'. In the exemplary embodiment shown in FIG. 19, the point pattern 10' is formed by four illumination points 12'.

In the method described with reference to FIG. 18 and FIG. 19, respectively, it is disadvantageous that the distance between two adjacent illumination points of the point pattern is linked to the number of illumination points. The size of the point pattern increases with the square of the number of illumination points, which can rapidly result in disadvantageously large point patterns. With a small number of illumination points, the distance between two adjacent illumination points is sometimes disadvantageously small.

By comparison with the methods according to the prior art as shown with reference to FIGS. 15 to 19, exemplary embodiments of the invention are advantageous to the effect that they enable flexible generation of an optimum point pattern for scanning the sample.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10, 10' Point pattern
12, 12' Illumination point
14 Scan line
16 Scan step
18 Scan pass
20 Group of illumination points
40 Predefined region
41, 41' Scanned region
42, 42' Edge of the scanned region
44 Part of the scanned region
50 Microscope
52 Control unit
54 Dichroic mirror
56 Deflection mirror
60 Scanning device
62, 78 Optical component
64 Deflection elements
70 Illumination unit
72 Light source
74 Illumination light beam
76 Device for splitting the illumination light beam
80 Detection unit
80' Pinhole stop detection unit
82 Camera sensor
84 Bandpass filter
86 Multi-photon block
87 Array of pinhole stops
88 Point detector 89 Pinhole stop
90 Objective optical unit
100 Sample
P Double-headed arrow

The invention claimed is:

1. A method for scanning a sample, the method comprising:
generating at least two illumination points in order to form a point pattern;
presetting or setting at least one parameter for defining the point pattern; and
scanning at least one predefined region of the sample by moving the point pattern defined by the at least one parameter along a first direction such that a first set of scan lines assigned to the at least two illumination points of the point pattern are generated, and along a second direction, and then again along the first direction, such that a second set of scan lines are generated,
wherein a distance defined in scan lines between the at least two illumination points of the point pattern is at least one scan line,
wherein the movement of the point pattern in the second direction is carried out in scan steps of identical size or at a constant speed,
wherein a length of the predefined region along the second direction is greater than a length of the point pattern along the second direction by at least a factor of two, and
wherein the at least two illumination points of the point pattern are arranged on a line along the second direction.

2. The method as claimed in claim 1, wherein, the predefined region is scanned continuously or step by step during the movement of the point pattern in the first direction.

3. The method as claimed in claim 1, wherein, the predefined region is scanned step by step or continuously in the second direction, and wherein, the point pattern is moved by at least one scan line along the second direction in one of the scan steps during the step by step or continuous scanning.

4. The method as claimed in claim 1, wherein the at least two illumination points of the point pattern are arranged equidistantly or form at least two groups of illumination points with the illumination points of each of the groups being arranged equidistantly.

5. The method as claimed in claim 1, wherein the distance which is defined in scan lines between the at least two illumination points of the point pattern and/or a number of groups of illumination points of the point pattern are/is set as the at least one parameter.

6. The method as claimed in claim 1, wherein the distance which is defined in scan lines between the at least two illumination points of the point pattern is set as the at least one parameter, and wherein the point pattern, in order to scan the predefined region, is moved in at least two scan passes along the first and second directions.

7. The method as claimed in claim 6, wherein a part of the predefined region is scanned in each of the at least two scan passes, and wherein the parts of the predefined region that are scanned in successive ones of the at least two scan passes are offset relative to one another in each case by at least one scan line along the second direction.

8. The method as claimed in claim 6, wherein in each of the scan passes, the predefined region is scanned step by step along the second direction by the point pattern being moved, in a respective one of the scan steps, by a number of scan lines along the second direction which is equal to a product of a number of illumination points of the point pattern and the distance which is defined in scan lines between the at least two illumination points of the point pattern.

9. The method as claimed in claim 1, wherein the at least one parameter comprises a number of groups of illumination points of the point pattern, wherein the number of groups of illumination points of the point pattern is a divisor of a total number of illumination points of the point pattern, and wherein the number of illumination points of each of the number of groups are identical.

10. The method as claimed in claim 9, wherein the distance which is defined in scan lines between the at least two illumination points of the point pattern which are assigned to a single one of the groups of illumination points of the point pattern is equal to the number of groups of illumination points of the point pattern.

11. The method as claimed in claim 9, wherein the distance which is defined in scan lines between the at least two illumination points of the point pattern which are assigned to successive groups of illumination points of the point pattern is equal to a sum of the number of groups of illumination points of the point pattern and one.

12. The method as claimed in claim 9, wherein the predefined region is scanned step by step along the second direction by the point pattern being moved, in a respective one of the scan steps, by a number of scan lines along the second direction that is equal to the number of illumination points of the point pattern.

13. The method as claimed in claim 1, wherein the at least two illumination points of the point pattern are generated from an illumination light beam with aid of an acousto-optical deflector or with aid of a beam splitter.

14. The method as claimed in claim 1, wherein, the predefined region is scanned step by step in the second direction, and wherein during subsequent scan steps, the point pattern is moved in the second direction and in a third direction that is oppositely to the second direction.

15. The method as claimed in claim 1, wherein:
the at least two illumination points form at least two groups of illumination points, each of the groups comprising two or more illumination points,
the at least two groups of illumination points are spaced from each other along the second direction by a first spacing distance,
the two or more illumination points of each of the at least two groups of illumination points are arranged equidistantly from each other by a second spacing distance, and
the first spacing distance is different from the second spacing distance.

16. A device for scanning a sample, the device comprising:
an illumination unit configured to generate at least two illumination points in order to form a point pattern;
a deflection element; and
a control unit configured to control the illumination unit based on a set or preset value of at least one parameter for defining the point pattern,
wherein the point pattern is movable using the deflection element, in order to scan at least one predefined region of the sample, along a first direction such that a first set of scan lines assigned to the at least two illumination points of the point pattern are generated, and along a second direction, and then again along the first direction, such that a second set of scan lines are generated, wherein a distance defined in scan lines between the at least two illumination points of the point pattern is at least one scan line, wherein the movement of the point pattern in the second direction is carried out in scan steps of identical size or at a constant speed, and wherein a length of the predefined region along the second direction is greater than a length of the point pattern along the second direction by at least a factor of two.

17. A microscope comprising the device as claimed in claim 16.

18. A method for scanning a sample, the method comprising:

generating at least two illumination points in order to form a point pattern;

presetting or setting at least one parameter for defining the point pattern; and scanning at least one predefined region of the sample by moving the point pattern defined by the at least one parameter along a first direction such that a first set of scan lines assigned to the at least two illumination points of the point pattern are generated, and along a second direction, and then again along the first direction, such that a second set of scan lines are generated, wherein the movement of the point pattern in the second direction is carried out in scan steps of identical size or at a constant speed, wherein the at least two illumination points of the point pattern are arranged on a line along the second direction, wherein the at least two illumination points form at least two groups of illumination points, each of the groups comprising two or more illumination points, the at least two groups of illumination points are spaced from each other along the second direction by a first spacing distance, the two or more illumination points of each of the at least two groups of illumination points are arranged equidistantly from each other by a second spacing distance, and the first spacing distance is different from the second spacing distance.

19. The method according to claim 18, wherein the first spacing distance is greater than the second spacing distance.

20. The method according to claim 18, wherein the predefined region is scanned step by step along the second direction by the point pattern being moved, in a respective one of the scan steps, by a number of scan lines along the second direction that is equal to the number of illumination points of the point pattern.

* * * * *